United States Patent
Bottari et al.

(10) Patent No.: US 10,687,129 B2
(45) Date of Patent: Jun. 16, 2020

(54) DATA CENTER NETWORK

(71) Applicant: Telefonaktiebolaget LM Ericsson (publ), Stockholm (SE)

(72) Inventors: Giulio Bottari, Pisa (IT); Antonio D'Errico, Pisa (IT); Luca Giorgi, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/096,358

(22) PCT Filed: Apr. 25, 2016

(86) PCT No.: PCT/EP2016/059207
§ 371 (c)(1),
(2) Date: Oct. 25, 2018

(87) PCT Pub. No.: WO2017/186265
PCT Pub. Date: Nov. 2, 2017

(65) Prior Publication Data
US 2019/0132659 A1 May 2, 2019

(51) Int. Cl.
*H04Q 11/00* (2006.01)
*H04L 12/46* (2006.01)
(Continued)

(52) U.S. Cl.
CPC ......... *H04Q 11/0005* (2013.01); *H04B 10/27* (2013.01); *H04L 12/46* (2013.01);
(Continued)

(58) Field of Classification Search
CPC ....... H04Q 11/0005; H04Q 2011/0039; H04Q 11/00; H04L 12/46; H04B 10/27; H04B 10/2581; H04J 14/04; H04J 14/00
(Continued)

(56) References Cited

U.S. PATENT DOCUMENTS

| 5,218,465 A * | 6/1993 | Lebby | ..................... H04L 45/00 340/2.9 |
| 6,417,944 B1 * | 7/2002 | Lahat | ..................... H04L 49/104 398/79 |

(Continued)

FOREIGN PATENT DOCUMENTS

WO   2015 051839 A1   4/2015

OTHER PUBLICATIONS

SDN-Enabled All-Optical Circuit Switching: An Answer to Data Center Bandwidth Challenges by Polatis, White Paper—2005.
(Continued)

*Primary Examiner* — Dibson J Sanchez
(74) *Attorney, Agent, or Firm* — Sage Patent Group

(57) ABSTRACT

A data center network node comprising at least one server connection for connecting to a server 6, a connection 7 for connecting the at least one server 6 to a first subnetwork. The first subnetwork is a conventional subnetwork which comprises at least one of a switch or a router. The node further comprises an optical receiver array 20 for connecting the node to an optical offload subnetwork, wherein the optical receiver array 20 comprises a plurality of optical receivers. The array is configured such that each receiver is connectable to an optical path within a multi-path optical connection. The node further comprises an optical transmitter array 23 for connecting the node to an optical offload subnetwork. The optical transmitter array comprises a plurality of optical transmitters. The array is configured such that each receiver is connectable to an optical path within a multi-path optical connection. The node further comprises an electrical switching arrangement 26 for directing an incoming data stream from a receiver in the receiver array 22 to at least one of the at least one server connection to server 6 or at least one transmitter in the transmitter array 23, and for directing an outgoing data stream from one of the at least one server 6 to (Continued)

at least one transmitter in the transmitter array 23. The electrical switching arrangement 26 provides for effective transport of data in a data center, e.g. transporting high bandwidth elephant flows on an optical offload network. The electrical switching arrangement 26 enables the provision of point to multipoint connections for data streams by enabling a data stream to be passed to multiple transmitters or received at a node, sent to a server in the node, and transmitted to a subsequent node in the network. Once high bandwidth flow demands have been identified, a schedule of logical links between the nodes of the network is constructed so as to enable the high bandwidth flows to be transmitted on the offload network. The development of the schedule is implemented by an orchestrator 29 and comprises constructing a booking list for high bandwidth flows, wherein a high bandwidth flow is a data stream which has a capacity requirement greater than a threshold.

19 Claims, 20 Drawing Sheets

(51) Int. Cl.
| | | |
|---|---|---|
| *H04B 10/27* | (2013.01) | |
| *H04J 14/00* | (2006.01) | |
| *H04B 10/2581* | (2013.01) | |
| *H04J 14/04* | (2006.01) | |

(52) U.S. Cl.
CPC ........... *H04B 10/2581* (2013.01); *H04J 14/00* (2013.01); *H04J 14/04* (2013.01); *H04Q 11/00* (2013.01); *H04Q 2011/0039* (2013.01)

(58) Field of Classification Search
USPC .................................... 398/43–103, 140–172
See application file for complete search history.

(56) References Cited

U.S. PATENT DOCUMENTS

| | | | | |
|---|---|---|---|---|
| 6,501,866 B2* | 12/2002 | Thomas | .................. | H04J 14/02 385/1 |
| 6,606,427 B1* | 8/2003 | Graves | ................. | G02B 6/3849 385/17 |
| 6,980,736 B1* | 12/2005 | Fee | .................... | H04Q 11/0005 398/12 |
| 7,412,164 B2* | 8/2008 | Choi | ......................... | H04L 1/22 398/4 |
| 9,124,383 B1* | 9/2015 | Frankel | .................... | H04J 14/06 |
| 9,462,359 B2* | 10/2016 | Mehrvar | ............ | H04Q 11/0062 |
| 9,929,933 B1* | 3/2018 | Viljoen | .................. | H04B 10/27 |
| 10,382,361 B1* | 8/2019 | Saleh | ................ | H04Q 11/0066 |
| 2001/0015839 A1* | 8/2001 | Koh | ...................... | H04J 3/0685 398/47 |
| 2002/0033978 A1* | 3/2002 | Lee | .................... | H04Q 11/0005 398/87 |
| 2003/0194236 A1* | 10/2003 | Kim | ................... | H04Q 11/0062 398/50 |
| 2004/0052520 A1 | 3/2004 | Halgren et al. | | |
| 2004/0146299 A1* | 7/2004 | Clapp | ................. | H04J 14/0227 398/49 |
| 2006/0133811 A1* | 6/2006 | Gumaste | ............. | H04J 14/0227 398/83 |
| 2006/0159456 A1* | 7/2006 | Gumaste | ............. | H04J 14/0204 398/59 |
| 2006/0188258 A1* | 8/2006 | Gumaste | ............. | H04J 14/0227 398/59 |
| 2006/0210274 A1* | 9/2006 | Lichtman | ............ | H04J 14/0201 398/83 |
| 2006/0257143 A1* | 11/2006 | Cavazzoni | .......... | H04J 14/0227 398/49 |
| 2007/0025729 A1* | 2/2007 | Barnard | .............. | H04J 14/0204 398/5 |
| 2007/0292134 A1* | 12/2007 | Hinderthur | ............. | H04L 12/43 398/98 |
| 2009/0136234 A1* | 5/2009 | Mottahedin | ............ | H04B 10/40 398/135 |
| 2010/0306408 A1* | 12/2010 | Greenberg | .......... | H04L 12/4633 709/238 |
| 2012/0033968 A1* | 2/2012 | Testa | .................... | H04J 14/0204 398/47 |
| 2012/0321309 A1* | 12/2012 | Barry | ...................... | H04J 14/00 398/51 |
| 2012/0321310 A1* | 12/2012 | Spock | ...................... | H04J 14/00 398/59 |
| 2013/0022352 A1* | 1/2013 | Yamashita | .......... | H04J 14/0212 398/34 |
| 2013/0195452 A1* | 8/2013 | Hui | ....................... | H04J 14/022 398/50 |
| 2013/0243431 A1* | 9/2013 | Pointurier | .............. | H04B 10/29 398/48 |
| 2013/0294458 A1* | 11/2013 | Yamaguchi | ......... | G06F 15/7825 370/412 |
| 2014/0363160 A1* | 12/2014 | Gumaste | ............. | H04J 14/0212 398/48 |
| 2015/0181317 A1* | 6/2015 | Yin | .................... | H04Q 11/0062 398/45 |
| 2015/0237421 A1* | 8/2015 | Morgan | ............. | H04Q 11/0005 398/45 |
| 2016/0044393 A1* | 2/2016 | Graves | ............... | H04Q 11/0003 398/51 |
| 2016/0204856 A1* | 7/2016 | Yin | ...................... | H04B 10/038 398/5 |
| 2016/0337726 A1* | 11/2016 | Yan | ........................ | H04B 10/27 |
| 2017/0054524 A1* | 2/2017 | Gumaste | ............ | H04J 14/0212 |
| 2018/0026724 A1* | 1/2018 | Tanimura | ........... | H04Q 11/0066 398/79 |

OTHER PUBLICATIONS

International Search Report for International application No. PCT/EP2016/059207—dated Jan. 17, 2017.

\* cited by examiner

DATA CENTER NETWORK

CROSS-REFERENCE TO RELATED APPLICATIONS

This application is a 35 U.S.C. § 371 national stage application for International Patent Application No.: PCT/EP2016/059207, entitled "Data Center Network", filed on Apr. 25, 2016, the disclosures and contents of which are hereby incorporated by reference in their entireties.

TECHNICAL FIELD

The field of the disclosure is data center internal networks. The disclosure relates to a data center network node, a data center network, a method of operating a data center network node and a method of operating a data center network.

BACKGROUND

Data centers or large clusters of servers have become increasingly employed in universities, enterprises and consumer settings to run a variety of applications such as web services, instant messaging, gaming, data analysis, scientific computing and many others. Data centers typically comprise many thousands of servers arranged hierarchically, typically with racks containing 10-40 servers each, linked by a Data Center Network (DCN). FIG. 1 is a schematic diagram of a traditional data center network. The data center (1) comprises a link to external networks (2), servers (6) and a switching hierarchy (7) comprising core routers (3), access routers (4), switches (5) cross point switches (8).

A major problem in such networks lies in large data flows, known as "elephant flows", which typically originate from server back-up, cloning, load balancing, backup, Virtual Machine migrations, or communication among memory banks and CPU in hyper scales data centers. Elephant flows are comparatively rare, but when they are present, they can dominate a data center network at the expense of smaller so-called "mice flows". This can have a highly detrimental effect on the quality of service of mice flows, which are typically delay sensitive. FIG. 2 is a graphical representation of "elephant" and "mice" flows. The graph shows network load (9) against time (10), with mice flows (11) below a threshold (12) and elephant flows (13) above the threshold. Although relatively rare, elephant flows cause major problems as they dominate the network and are highly detrimental to delay and delay variation in smaller flows.

One solution to this problem is the use of "packet offload", wherein a dedicated optical network is provided for elephant flows. Offload enables transit traffic to optically bypass intermediate packet processing entirely, resulting in reduced required capacity and optimized power consumption. Moreover, capacity of optical channels allows accommodating bandwidth hungry data transfers.

FIG. 3 is a schematic diagram of an optical offload network for a data center network according to the prior art. In addition to the usual electrical switching arrangements (7), there is an optical network (14). Each rack of servers has a top of rack (ToR) switch (15), each of which is connected to the optical network (14). The optical network comprises an optical cross-connect (16) in the form of a Micro-electrical mechanical switch (MEMS).

Although effective in providing an optical offload, such a network is expensive to implement. There is also a lack of flexibility in providing point to multipoint connection to allow one node to communicate simultaneously with more than one other node.

SUMMARY

According to a first aspect, there is provided a data center network node comprising at least one server connection for connecting to a server, and a connection for connecting the at least one server to a first subnetwork. The first subnetwork comprising at least one of a switch or a router. The node further comprising an electrical switching arrangement and at least one server connection for connecting the electrical switching arrangement to a server. The node further comprising an optical receiver array for connecting the electrical switching arrangement to an optical offload subnetwork. The node further comprising an optical transmitter array for connecting the electrical switching arrangement to an optical offload subnetwork. The electrical switching arrangement is configured to direct an incoming data stream from a receiver in the receiver array to at least one of the at least one server connection or at least one transmitter in the transmitter array, and to direct an outgoing data stream from one of the at least one server connection to at least one transmitter in the transmitter array.

The electrical switching arrangement provides for effective transport of data in a data center, e.g. transporting elephant flows on an optical offload network. In some examples, the electrical switching arrangement enables the provision of point to multipoint connections for data streams by enabling a data stream to be passed to multiple transmitters or received at a node, sent to a server in the node, and transmitted to a subsequent node in the network. The optical electrical optical arrangement of the optical unit also provides "3R" regeneration of signals at each node.

Optionally, the optical receiver array is configured such that each receiver is connectable to an optical path within a multi-path optical connection and the optical transmitter array is configured such that each transmitter is connectable to an optical path within a multi-path optical connection.

In some examples, the first subnetwork comprising at least one of a switch or a router, an optical receiver array for connecting the node to an optical offload subnetwork. The optical receiver array comprising a plurality of optical receivers, the array being configured such that each receiver is connectable to an optical path within a multi-path optical connection, an optical transmitter array for connecting the node to an optical offload subnetwork. The optical transmitter array comprising a plurality of optical transmitters, the array being configured such that each receiver is connectable to an optical path within a multi-path optical connection. An electrical switching arrangement for directing an incoming data stream from a receiver in the receiver array to either one of the at least one server connection or at least one transmitter in the transmitter array, and for directing an outgoing data stream from one of the at least one servers to at least one transmitter in the transmitter array.

In an embodiment the electrical switching arrangement is configured to enable an incoming data stream to bypass of the at least server connection.

In an embodiment the optical receiver array comprises a coupler for coupling the receivers to a multicore optical fiber and the optical transmitter array comprises a coupler for coupling the transmitters to a multicore optical fiber.

In an embodiment the electrical switching arrangement is configurable to direct a data stream from one of the at least one servers to a plurality of transmitters.

In an embodiment the data center network node is configured to buffer the data stream, transmit the data stream to a first of the plurality of transmitters and transmit the data stream to a second of the plurality of transmitters after a time delay.

In an embodiment the electrical switching arrangement is further configurable to receive a data stream at one of the plurality of receivers, direct the data stream from the receiver to one of the at least one servers and direct the data stream to one or more of the plurality of transmitters.

In an embodiment the electrical switching arrangement is further configurable to receive a first copy of a data stream for a point to multipoint connection at a first receiver, receive a second copy of the data stream for the point to multipoint connection at a second receiver, direct the data stream from the first receiver to one of the at least one servers and direct the data stream from the second receiver to at least one transmitter.

In an embodiment the data center network node is further configured to enable one or more of the transmitters and receivers, when not involved in a data stream transmission, to be put into an idle mode.

In a second aspect, there is provided a data center network comprising a first subnetwork, an optical offload subnetwork and a plurality of network nodes. The first subnetwork comprises at least one of a switch or a router. Each network node comprises at least one server connection for connecting to a server, a data connection for connecting to the first subnetwork, an optical receiver array comprising a plurality of optical receivers, the array being configured such that each receiver is connectable to an optical path within a multi-path optical connection. The network further comprises an optical transmitter array comprising a plurality of optical transmitters, the array being configured such that each receiver is connectable to an optical path within a multi-path optical connection and an electrical switching arrangement for directing an incoming data stream from a receiver in the receiver array either, to one of the at least one servers, or to at least one transmitter in the transmitter array, and for directing an outgoing data stream from one of the at least one servers to at least one transmitter in the transmitter array and the optical offload subnetwork comprises a plurality of optical multi-path connections, each multi-path optical connection comprising a plurality of optical paths, the optical offload network being configured such that each node is connected to at least one other node by a multi-path optical connection.

The multi-path optical connection with multiple optical paths allows not only higher capacity, but also enables point to multipoint connections to be established for data streams. For example, the arrangement enables point to multipoint connections where a time offset is required in the transmission of the data stream to different nodes.

In an embodiment at least one multi-path connection comprises a multicore optical fiber and each optical path comprises a core within the multicore fiber.

In an embodiment the data center network further comprises an orchestrator for scheduling transmission on the optical offload network. the orchestrator comprising a processor, a memory and a network interface card, the orchestrator being configured to set a threshold for identifying a data stream as a high bandwidth flow if the data stream has a capacity requirement higher than the threshold during a measurement period detect or determine high bandwidth flow demands by comparing capacity requirements of data stream with the threshold. The network is further configured to construct a schedule for transmission of high bandwidth flows between network nodes in the optical offload subnetwork and identify two or more nodes through which a high bandwidth flow is to pass and provide instructions to provide each of the two or more nodes with one or more of a configuration instruction for an outgoing data stream which instructs the node to configure the electrical switching arrangement to direct the data stream from one of the at least one server to one or more optical paths in the outgoing multi-path optical connection and a configuration instruction for an incoming data stream which instructs the node to configure the electrical switching arrangement to direct the data stream from one or more optical paths in its incoming multi-path connection to at least one of at least one the server and/or to one or more optical paths in the outgoing optical multi-path connection.

In an embodiment, the electrical switching arrangement of at least one node is configurable to direct an outgoing data stream from one of the at least one servers to a plurality of transmitters in the transmitter array, such as to enable a point to multipoint connection for the data stream by copying the data stream to a plurality of transmitters at the at least one node.

In an embodiment, the electrical switching arrangement of at least one node is configurable to direct incoming an data stream from a receiver in the receiver array to one of the at least one servers and to at least one transmitter in the transmitter array, such as to enable a point to multipoint connection for the data stream by copying the data stream to the at least on server and to at least one server in at least one other node.

In a third aspect there is provided a method of operating a data center network node, the node comprising at least one server, and an incoming multi-path optical connection comprising a plurality of optical paths. An outgoing multi-path optical connection comprises a plurality of optical paths, an electrical switching arrangement for directing data streams between the optical paths on the incoming multi-path optical connection and the optical paths on the outgoing multi-path optical connection, and between the optical paths and at least one server. The method comprises, on receipt of a configuration instruction for an outgoing data stream, configuring the electrical switching arrangement to direct the data stream from one of the at least one server to one or more optical paths in the outgoing multi-path optical connection, and, on receipt of a configuration instruction for an incoming data stream, configuring the electrical switching arrangement to direct the data stream from one or more optical paths in its incoming multi-path connection to at least one of at least one the server and/or to one or more optical paths in the outgoing optical multi-path connection.

In an embodiment the method further comprises implementing a first transmission of the data stream on a first optical path and implementing a second transmission of the data stream a second optical path with a time offset between the first transmission and the second transmission.

In an embodiment the method further comprises putting into idle mode at least one receiver or transmitter which is not involved in a current transmission.

In an embodiment, the method further comprises, on receipt of a configuration instruction for an outgoing data stream associated with a point to multipoint connection, configuring the electrical switching arrangement to direct the data stream from one of the at least one server to a plurality of optical paths in the outgoing multi-path optical connection.

In an embodiment, the method further comprises, on receipt of a configuration instruction for an incoming data stream associated with a point to multipoint connection, configuring the electrical switching arrangement to direct the data stream from one or more optical paths in its incoming multi-path connection to at least one of at least one the server and to one or more optical paths in the outgoing optical multi-path connection.

In a fourth aspect, there is provided a method of operating a data center network, the network comprising a plurality of nodes linked by a first subnetwork comprising at least one of a switch or a router, and an optical offload subnetwork comprising a plurality of multi-path optical connections, wherein each node comprises at least one server, an incoming multi-path optical connection comprising a plurality of optical paths, an outgoing multi-path optical connection comprising a plurality of optical paths, an electrical switching arrangement for directing data streams between the optical paths and the at least one server, and a data connection for connecting the at least one server to the first subnetwork. The method comprises identifying a data stream, between a first server in an originating node and at least one server in at least one subsequent node, for offloading to the offload subnetwork, selecting a route through the offload network for the data stream. Selecting the route comprises identifying one or more subsequent nodes and/or one or more multi-path connections, through which the data stream must be transmitted. The method further comprises, for each of the one or more multi-path connections, selecting one or more optical paths for carrying the data stream, instructing the originating node to configure its electrical switching arrangement to direct the data stream from the first server to each of the one or more selected optical paths in its outgoing multi-path optical connection, and instructing each of the one or more subsequent nodes, to configure its electrical switching arrangement to direct the data stream from each of selected optical paths in its incoming multi-path connection to a server in the subsequent node and/or to an optical path in its outgoing multi-path optical connection.

In an embodiment, where the data stream is to be transmitted to a plurality of receiving servers, the method further comprises buffering the data stream in at least one node, transmitting the data stream to a node comprising a first receiving server; and after a time delay transmitting the data stream to a node comprising a second receiving server.

In an embodiment, where a plurality of data streams are to be transmitted, the method further comprises developing a schedule for offloading data streams to the optical offload network. Developing of the schedule comprises constructing a booking list for high bandwidth flows, wherein a high bandwidth flow is a data stream which has a capacity requirement greater than a threshold, detecting or determining whether a data stream has a capacity requirement greater than the threshold and if it has, identifying the data stream as a high bandwidth flow and adding an identifier to the high bandwidth flow to the booking list determine whether the capacity and timing requirements of the high bandwidth flow can be satisfied by the optical offload network. If the capacity requirement can be met, the identifier to the high bandwidth flow is inserted into the schedule. The schedule is communicated to network nodes through which the high bandwidth flow is to pass.

In an embodiment, the method further comprises establishing a point to multipoint connection by instructing the originating node, to configure its electrical switching arrangement to direct the data stream from the first server to a plurality of selected optical paths in its outgoing multi-path optical connection.

In an embodiment, the method further comprises establishing a point to multipoint connection by instructing the originating node to configure its electrical switching arrangement to direct the data stream from the first server to a selected optical path in its outgoing multi-path optical connection and instructing at least one subsequent node to configure its electrical switching arrangement to direct the data stream from an optical paths in its incoming multi-path optical connection to both a to a server in the subsequent node and to an optical path in its outgoing multi-path optical connection.

In a fifth aspect, there is provided a computer program, comprising instructions which, when executed on at least one processor, cause the at least one processor to carry out a method according to the third or fourth aspects.

In a sixth aspect there is provided a computer program product comprising a computer program according to the fifth aspect.

In a seventh aspect there is provided a carrier containing the computer program product according to the sixth aspect, wherein the carrier optionally includes an electrical signal, an optical signal, a radio signal, a magnetic tape or disk, an optical disk or a memory stick.

BRIEF DESCRIPTION OF THE DRAWINGS

The above and other aspects of the present invention will now be described by way of example only, with reference to the following figures.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

Aspects of the present disclosure provide a cost effective optical offload network whilst allowing flexibility in providing optical links necessary for point-to-multipoint connections and to allow for regeneration of signals at intermediary nodes. There is provided a data center network with a conventional subnetwork and an optical offload subnetwork. The conventional subnetwork comprises the usual type of switched network used in a data center network, with either a hierarchical or flat arrangement of switches and/or routers. The person skilled in the art will appreciate that many different arrangements are possible for the conventional subnetwork and the invention is not limited to any particular arrangement of the conventional subnetwork.

The optical offload subnetwork comprises an optical fiber network for providing point to point and point to multipoint links between nodes in order to transport high bandwidth flows between nodes. These optical offload links are separate from the conventional network. The data center network comprises a plurality of nodes, each comprising at least one server connection for connecting the node to servers, a connection for connecting to the conventional subnetwork, an electrical switching arrangement, an optical receiver array and an optical transmitter array. In an embodiment, the electrical switching arrangement and the transmitter/receiver arrays are configured as a single optical unit. The node is configured to enable connection of servers with either the conventional subnetwork or the offload subnetwork. The nodes are linked by an optical fiber multi-path connection comprising a plurality of optical paths.

Figure 1:
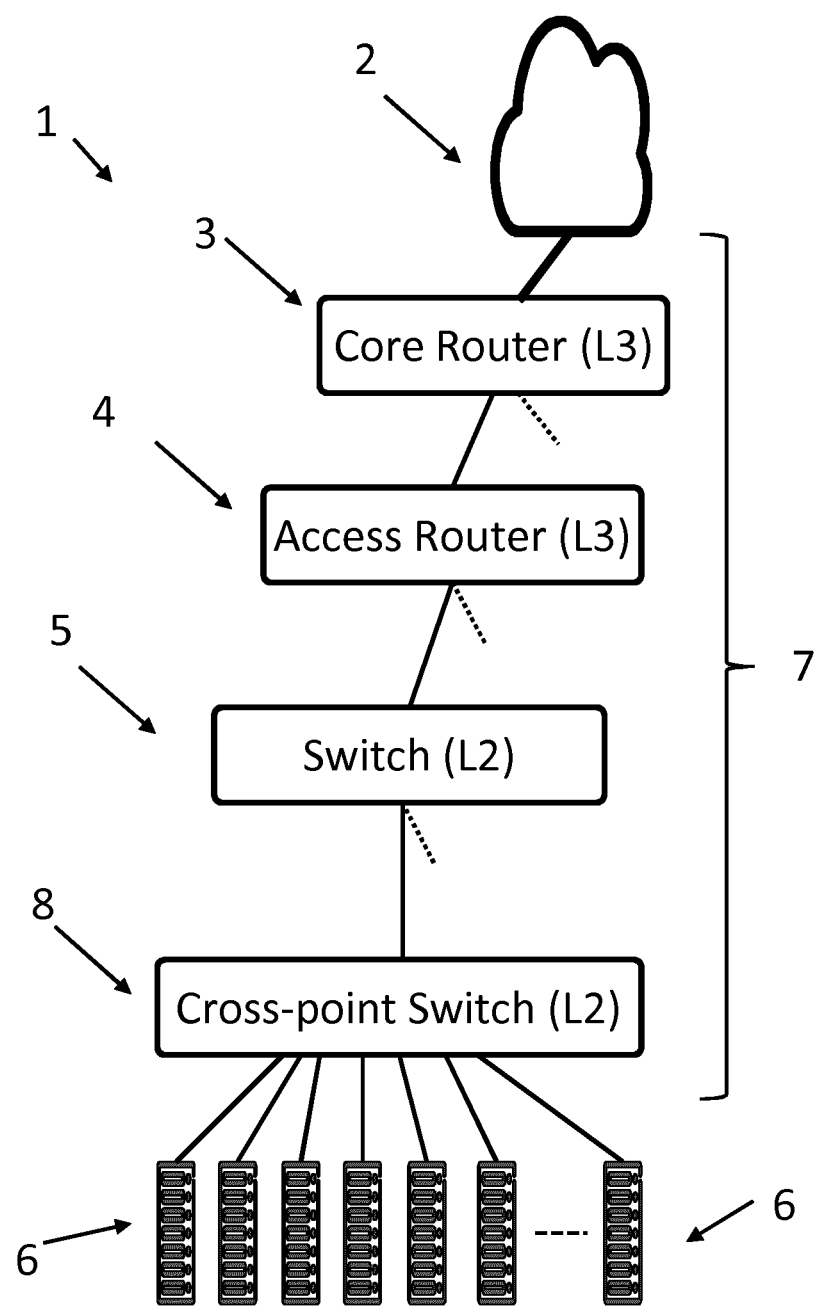
FIG. 1 is a schematic diagram of a data center network according to the prior art.
Figure 2:
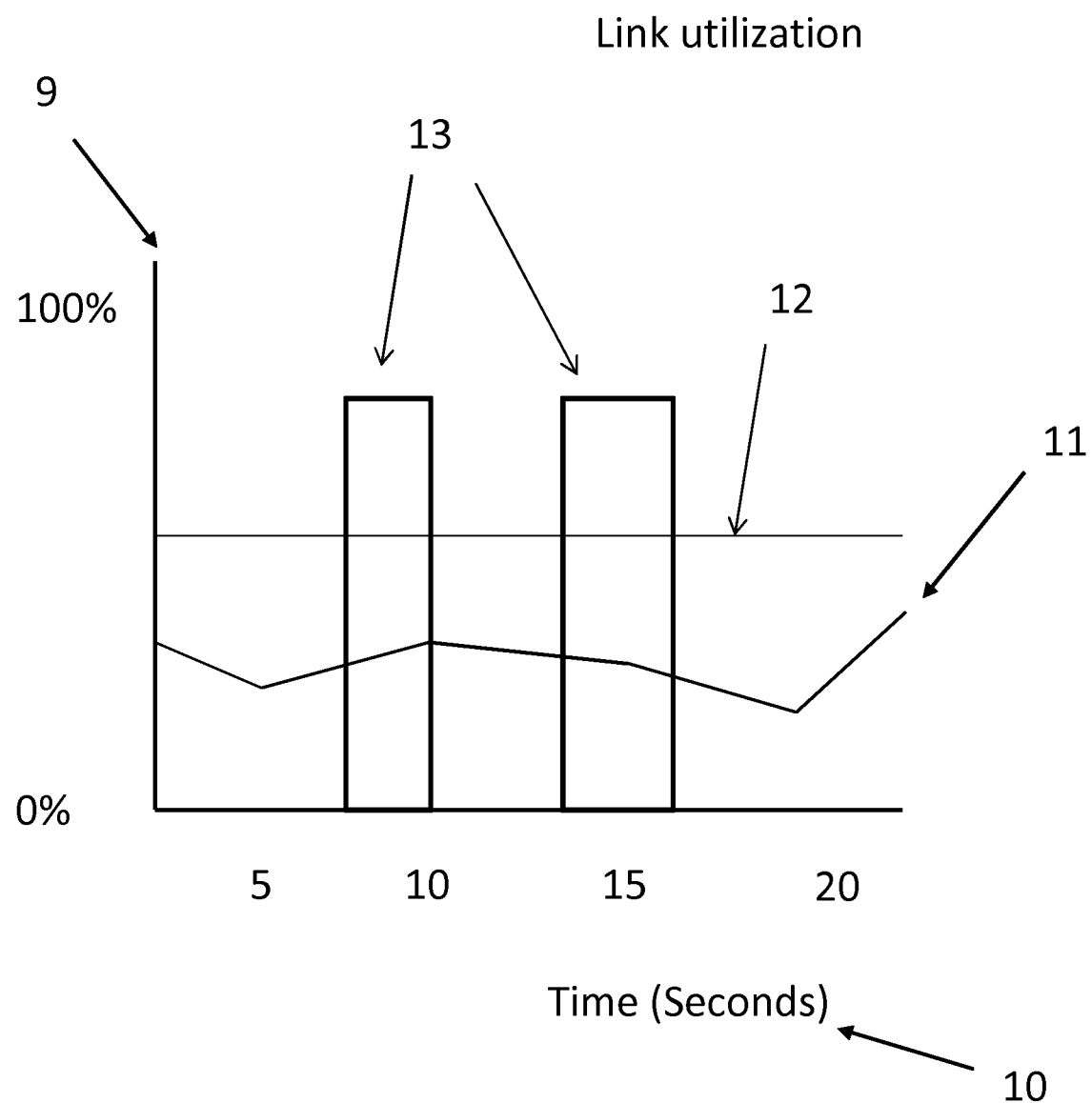
FIG. 2 is a graphical representation of network load against time showing "mice" and "elephant" flows.
Figure 3:
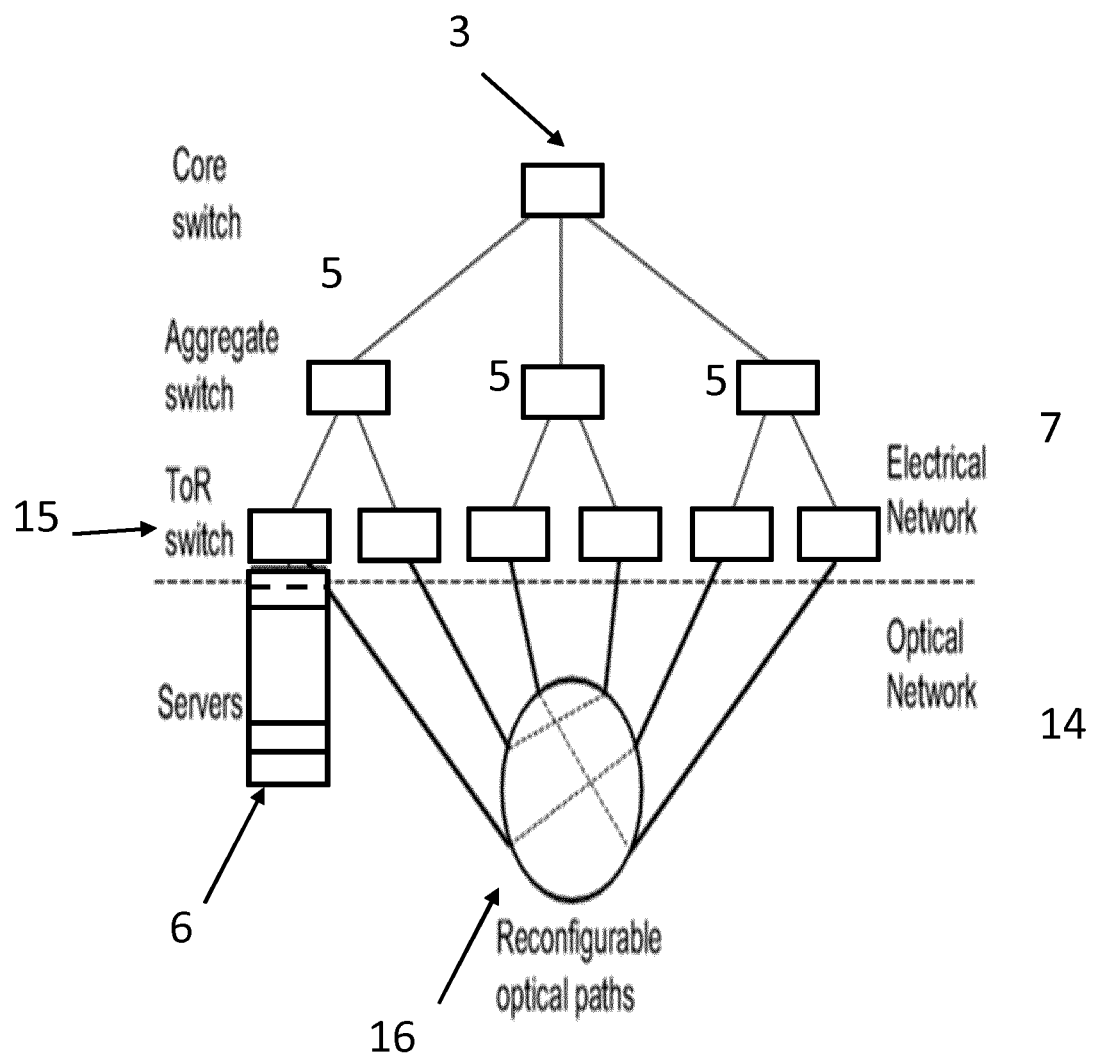
FIG. 3 is a schematic diagram of a data center network with an optical offload provided by means of an optical cross connect according to the prior art.
Figure 4:
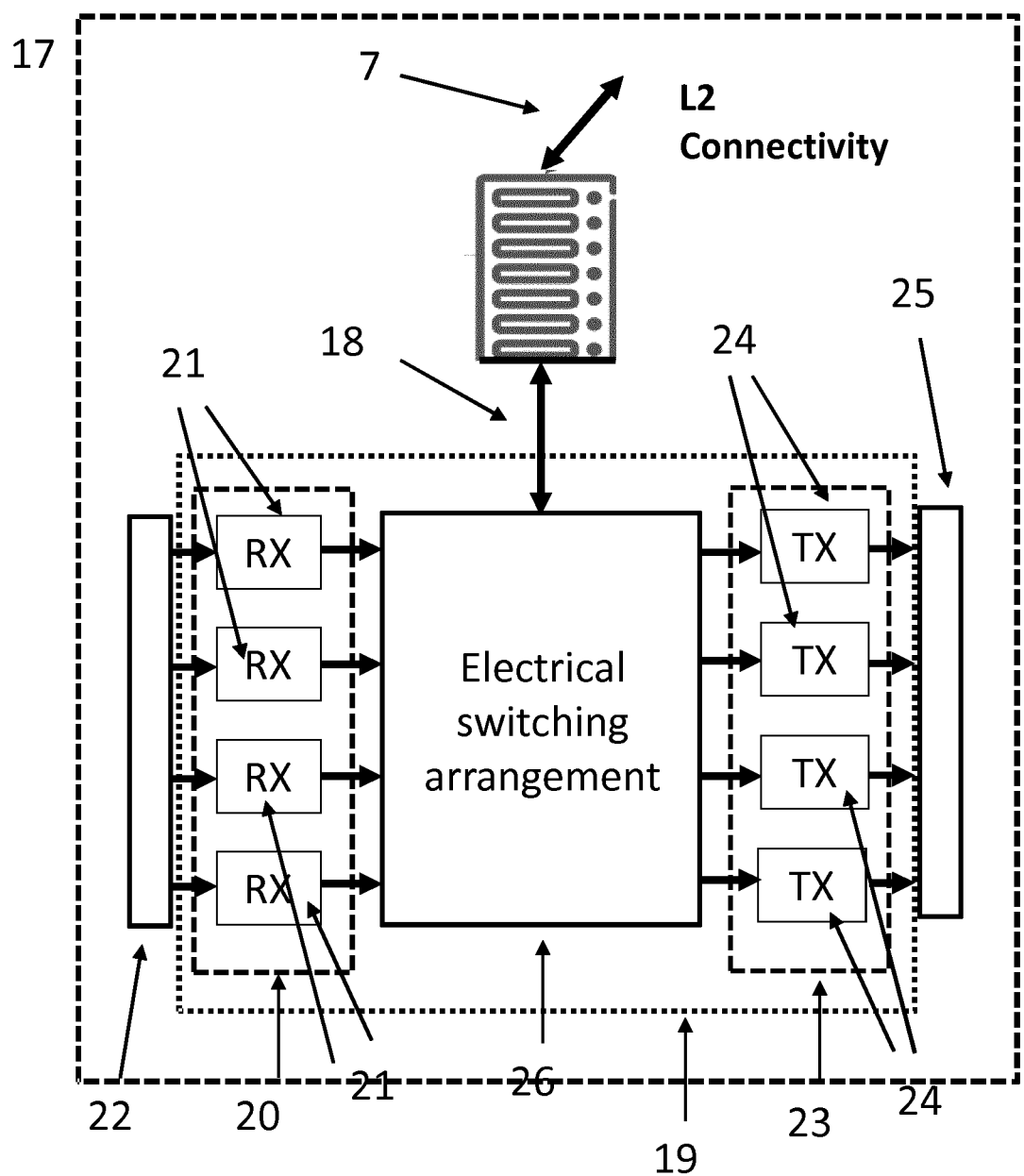
FIG. 4 is a schematic diagram of a data center network node according to an embodiment.

FIG. 4 is a schematic diagram of a data center network node according to an embodiment. The node (17) comprises at least one server connection (18) for connecting to a server (6), a connection (7) for connecting the server (6) to a conventional data center network comprising a switch or router and an optical unit (19). The at least one server connection (18) is for connecting the optical unit (19) to the server (6). The optical unit (19) comprises an optical receiver array (20) comprising a plurality of optical receivers (21), for linking the node to an incoming optical connection (22) and an optical transmitter array (23) comprising a plurality of optical transmitters (24) for connecting the node to an outgoing optical connection. In some examples, the optical receivers are optical detectors or sensors, e.g. photodiodes and the transmitters are an optical light source, e.g. lasers.

The optical receiver array (20) is configured to receive a plurality of optical signals, each optical signal being received over a different path of the multi-path connection. Each optical receiver (21) of the array (20) may be considered as is configured to receive one optical signal or configured to receive on one path of the multi-path signal. Each optical signal is independent of the other optical signals. One or more of the received optical signals may be the same or different to another optical signal. Similarly, the optical transmitter array (23) is configured to transmit a plurality of optical signals, each optical signal being transmitted over a different path of the multi-path connection. Each optical transmitter (24) of the array (23) may be considered as is configured to transmit one optical signal or configured to transmit on one path of the multi-path signal. Each optical signal is independent of the other optical signals. One or more of the transmitted optical signals may be the same or different to another optical signal.

In some aspects, each of the optical connections comprises a plurality of individual optical links. The optical unit (19) further comprises an electrical switching arrangement (26) for connecting the receivers and the transmitters with the server connection. The receivers (21) are configured to convert a received optical signal to an electrical signal. The electrical switching arrangement (26) is configured to switch the electrical signal to the server connection (18) for communication to the server, and/or to one or more transmitter (24). The transmitter (24) is configured to convert an electrical signal from the electrical switching arrangement (26) to an optical format for optical transmission to another node in the data center network. The electrical switching arrangement (26) may receive an electrical signal from either the receiver array (20) or the server connection (18), i.e. originating from a said server (6). The optical electrical optical arrangement of the optical unit provides "3R" regeneration of signals at each node.

In an embodiment, the electrical switching arrangement is configurable to enable a point to point connection between two nodes. In this arrangement the data stream originates at the first node and is directed by the first node's electrical switching arrangement (26) to one of its transmitters. The data stream is then carried on one of the paths in the outgoing optical connection from the first node. At the second node, the data stream is detected by a receiver and transmitted (i.e. passed) by the electrical switching arrangement to the server connection (18) of the second node. If there are any intermediate nodes, each of these intermediate nodes configures its electrical switching arrangement so that the data stream bypasses the server connection of the intermediate node, i.e. the electrical switching arrangement is configured to switch a received signal from a receiver (21) directly to a transmitter (24).

In an embodiment, the electrical switching arrangement is configurable to receive a data stream for a point to multi-point connection at one of its receivers, and to direct the data stream from the receiver to one of the servers (6) in the node and/or to direct the data stream to one or more of its transmitters. In this way, a data stream arriving at one of the receivers may be both dropped (i.e. transmitted) to a server and/or passed to a subsequent node. For example, if the receiving node is one of the plurality of destination nodes of the point to multipoint path, the electrical switching arrangement is configured to transmit a received signal to the server connection (18). If there are further destination nodes on the point to multipoint path (i.e. the node is not the last destination node), the electrical switching arrangement is configured to also transmit the received signal to one or more of the transmitters (24). For an intermediate nodes (i.e. not a destination node), the electrical switching arrangement is configured to directly transmit the received signal, so that the data stream bypasses the server connection of the intermediate node.

In an embodiment, the electrical switching arrangement is configurable to implement point to multipoint connections by receiving an identical data stream from two different receivers, e.g. a first and second data stream. If the node receiving the first and second data stream is purely an intermediate node, then the electrical switching arrangement is configured so that the first and second data stream streams are directed to separate transmitters and hence to their respective destination nodes. If the node receiving the first and second data stream is a destination node and an intermediate node, then the electrical switching arrangement is configured so as to direct one of the data streams (e.g. first data stream) to the server connection (18) and the other (e.g. second data stream) to a transmitter for transmission to a subsequent node. More than two identical data streams may be received, in which case typically one may be dropped and the others transmitted to subsequent nodes.

The optical offload network comprises an optical network for linking a plurality of data center nodes. In an embodiment the optical network is a ring network, although the person skilled in the art will appreciate that other network topologies such as a bus, a mesh or a star are also possible. The invention is not limited to any one optical topology. In an embodiment, the network comprises an arrangement in which for each node, the transmitter array is connected to a receiver array of a second node by a first multi-path optical connection and the receiver array is connected to a transmitter array of a third node by a second multi-path optical connection. In an embodiment, the ring provides a one way flow. Alternatively each section between nodes may be bidirectional, either with separate fibers for each direction or with bidirectional transmission on a single fiber. However, the person skilled in the art will appreciate that there are a number of ways in which the optical network can be laid out and the invention is not limited to any one configuration.

In an embodiment, the optical connections between nodes comprises a multicore optical fiber. For example, a single fiber connects a pair of nodes. In further examples, one or more multicore optical fiber connects the optical units of the data center nodes. A multicore fiber (MCF) is an optical fiber comprising a plurality of cores, each core providing a separate optical path. A MCF connects a first node and a second node. The first node comprises a connector to enable each transmitter (24) in the node's optical transmitter array (23) to be connected to a core of the multicore fiber. At the second node, the node comprises a connector so that each core of the multicore optical fiber is connected to an optical receiver (21) of the optical receiver array (20). Thus, the multicore optical fiber carries independent optical signals along each core. Each core is separately connected to the transmitter array and receiver array of each of the nodes of the optical offload network. The cores of multicore optical fiber may be considered as paths of the multi-path connection.

Figure 5:
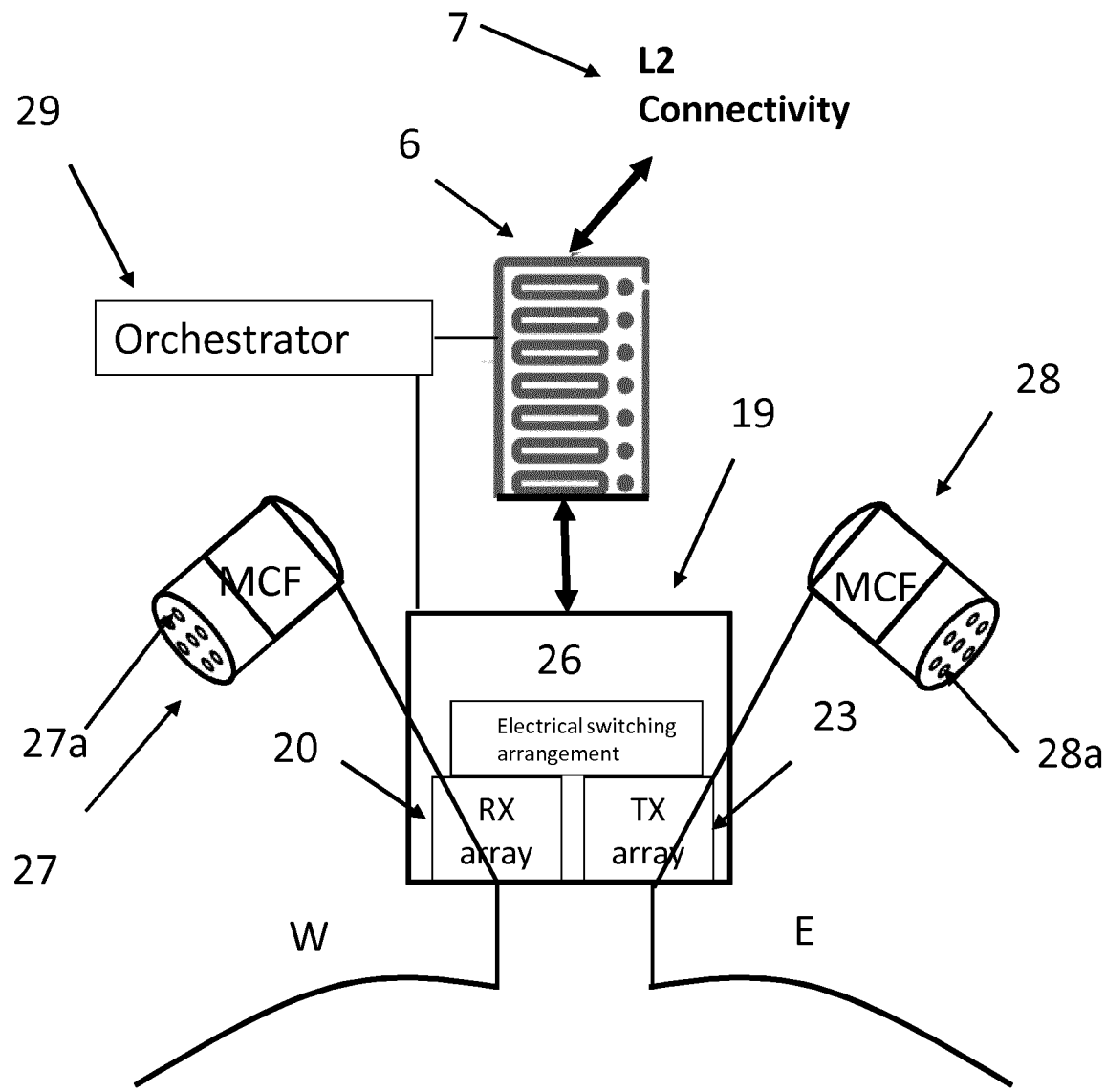
FIG. 5 is a schematic diagram of a data center network node linked into a data center network according to an embodiment.

FIG. 5 is a schematic diagram of a node connected to a multicore network according to an embodiment. There is provided an incoming optical connection (27) which comprises a multicore fiber (MCF) linked to the optical receiver array (20), labelled as a West (W) direction. The network further comprises an outgoing optical connection (28), which is linked to the optical transmitter array (23), labelled as an East (E) direction. An orchestrator (29) provides instructions to the node for configuring and control of the electrical switching arrangement (26).

The MCFs 27,28 are illustrated as comprising a plurality of cores 27a,28a. In this example, the MCFs comprise seven cores 27a,28a, although any number of cores may be included in the MCF. Each core 27a,28a provides an independent optical path for transmission of data, within the same fiber.

Figure 6:
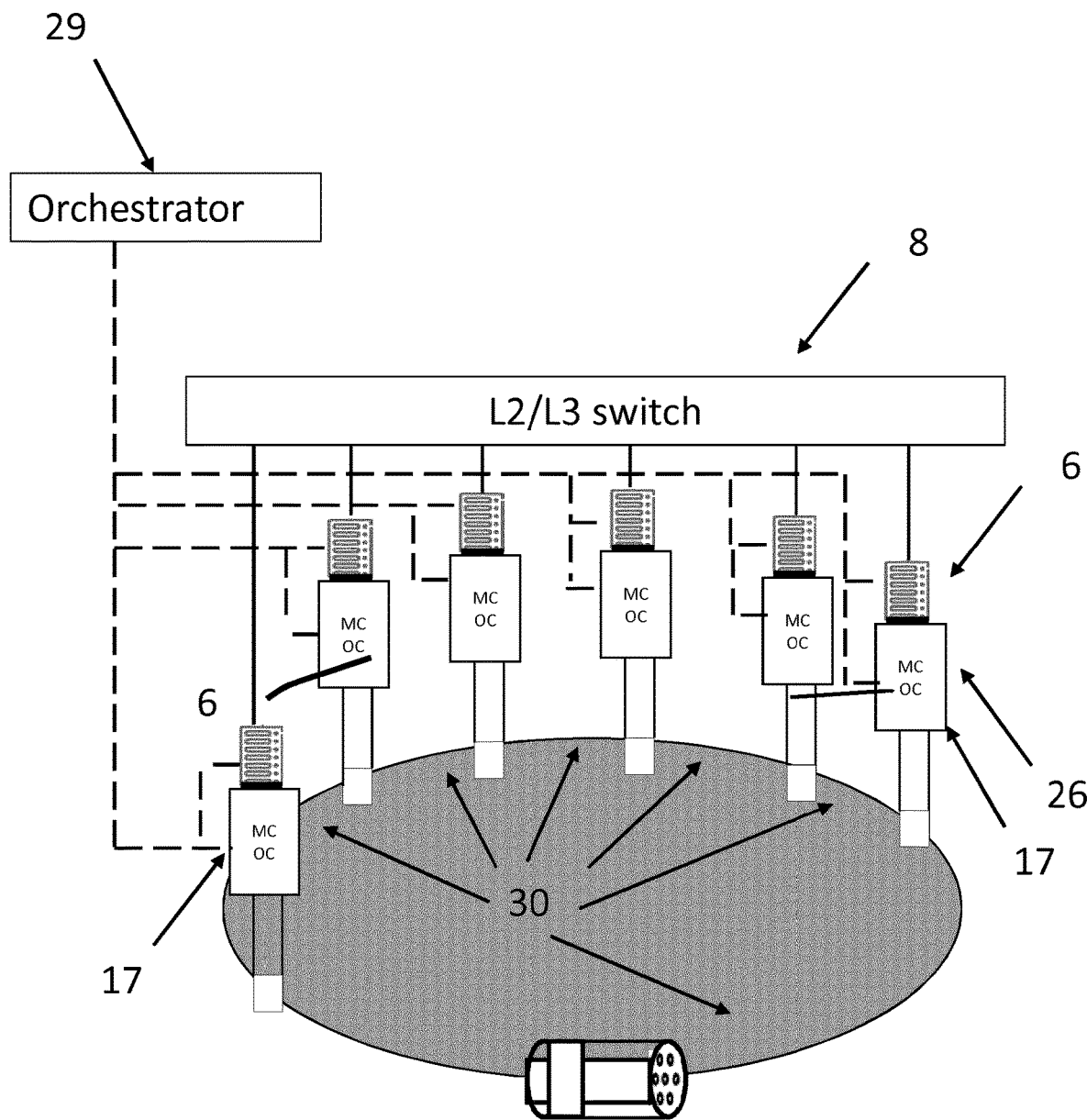
FIG. 6 is a schematic diagram of a data center network according to an embodiment.

FIG. 6 is a schematic diagram of a data center network according to an embodiment. There is provided a plurality of network nodes (17), each comprising an optical unit (19) as described and connected by means of an optical offload network (30).

In an embodiment, the electrical switching arrangement (26) enables data streams to be sent from a first server (6) in a first network node (17) to a second server (6) in a second network node (17). A point to point configuration is established between the first and the second network nodes by means of the electrical switching arrangement (26) in the first node being arranged to connect the first server to a transmitter in the first node's transmitter array (24). At the second node, a receiver in the receiver array (20) is connected to the second server by the electrical switching arrangement (26). In any intermediate node between the first and the second nodes, the electrical switching arrangement (26) is configured to provide a link from a receiver in the received array to a transmitter in the transmitter array, so that the data stream bypasses the server connection of the intermediate node. The optical offload network (30) can be seen to provide a separate connection between servers (6) than the conventional switched connection. (8). This provides for efficient transport of elephant flows between nodes within a data center.

Figure 7:
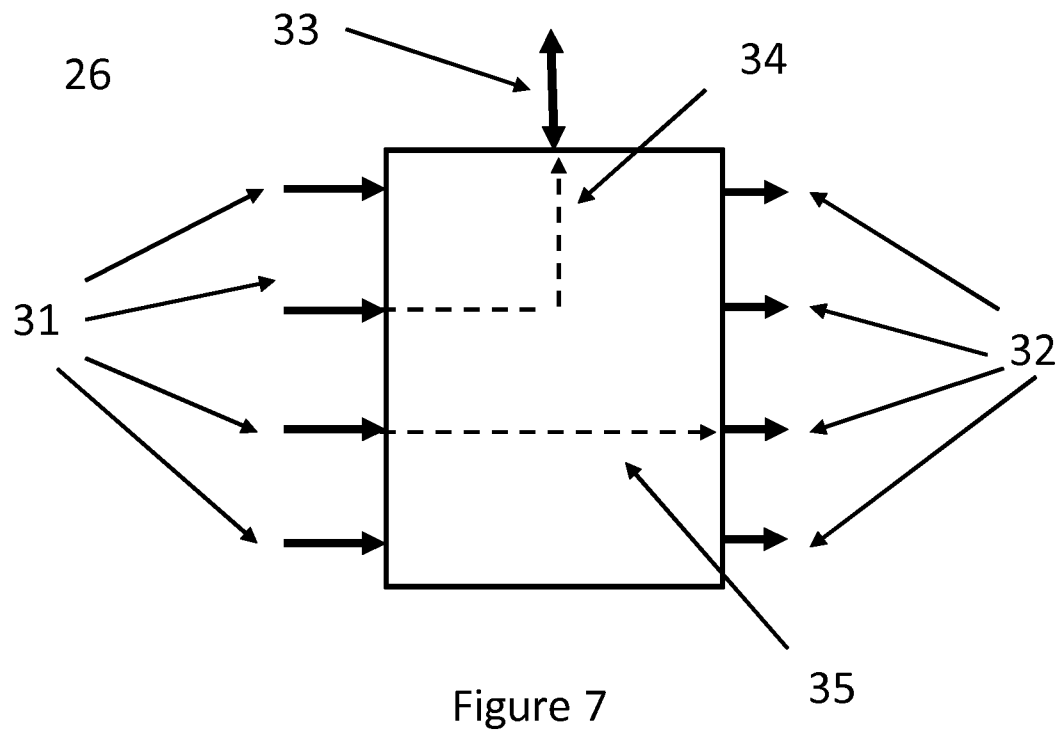
FIG. 7 is a schematic diagram of an example of the use of an electrical switching arrangement according to an embodiment.

FIG. 7 is a schematic diagram of the incoming connections within an electrical switching arrangement (26) according to an embodiment. The switching arrangement comprises a plurality of incoming electrical connections (31), each one being connected with an optical receiver (21), and a plurality of outgoing electrical connections (32), each one being connected to an optical transmitter (24). There is further provided at least one connection (33) to a server, corresponding to server connection (18). Two incoming data streams are illustrated, namely a first data stream (34) and a second data stream (35). The first data stream (34) is an incoming data stream destined for a server (6) in the node. The electrical switching arrangement (26) configures a link between the appropriate incoming connection (31) and an output (33) to the server connection. The second data stream (35) is destined for a different node and the electrical switching arrangement configures a connection from the incoming connection to an outgoing connection. Here the node is acting as an intermediate node and the data stream effectively bypasses the server connection of the node.

The first and second data streams may be different, independent, data streams, with different destinations. Alternatively, first and second data streams may be data streams carrying the same data. As such, the first data stream may be considered as a copy of the second data stream (or vice versa). This configuration of electrical switching arrangement (26) provides for a point-to-multipoint transmission. The first data stream (34) is to be dropped at the node to the server, as the node is a destination node of the point-to-multipoint transmission. The second data stream (35) is for onward transmission to another node of the optical offload network. As such, one core of the MCG (or path) is used for each destination node. A plurality of cores are initially used for the point-to-multipoint transmission, and the number of cores utilized reduces by one after each destination node is reached by a copy of the point-to-multipoint transmission.

In the embodiment illustrated, the server connection (33) is a single link connecting the electrical switching arrangement to a top of rack switch or, optionally, to a single server if only one server is present at the node. In another embodiment, the electrical switching arrangement comprises a plurality of server connections or outputs to a plurality of servers e.g. a full digital cross connect for connecting multiple servers to the receiver and transmitters. In another embodiment, there may be a plurality of connections on the server side, where the number of connections is less than the number of servers, in which multiple top of racks switches are provided. The person skilled in the art will appreciate that there are many different possible arrangements for the server side connections for the electrical switching arrangement and the invention is not limited to any one configuration.

Figure 8:
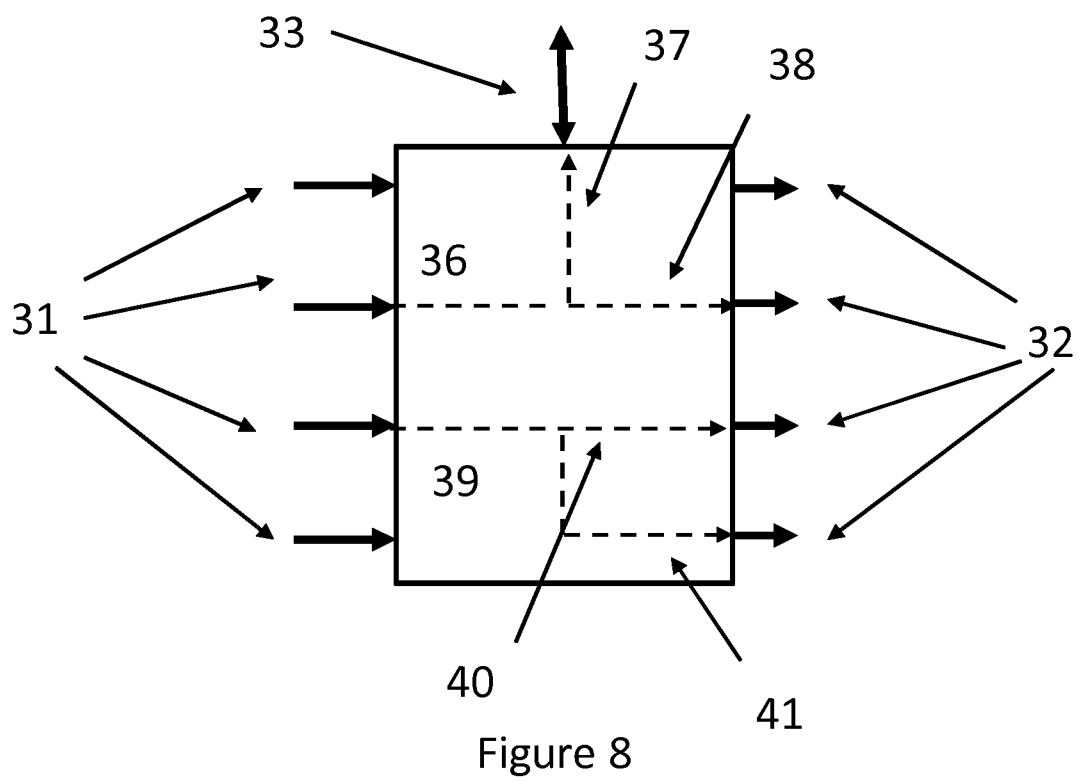
FIG. 8 is a schematic diagram of an example of the use of an electrical switching arrangement according to an embodiment.

FIG. 8 is a schematic diagram of a further example of the operation of an electrical switching arrangement according to an embodiment. FIG. 8 shows an example of the configuration of the electrical switching arrangement to enable point-to-multipoint data streams to be established. Two data streams are illustrated, namely a third data stream (36) and a fourth data stream (39). The third data stream (36) is an incoming stream destined both for the node illustrated and for a subsequent node, received at the receiver array.

The switching arrangement (26) is configured to direct the data stream (37) to the server connection (33) and also direct the data stream (38) to an outgoing connection, and hence to an optical transmitter of the transmitter array. Hence the data stream is both dropped to a server in the node and passed on for transmission to a subsequent node. This is an alternative configuration for providing for point-to-multipoint transmission.

In the example, the electrical switching arrangement can also be configured so as to enable a data stream to be duplicated on another path. The fourth data stream (39) is directed (40) to a first transmitter and directed (41) to a second transmitter. In a further example, the data stream is duplicated onto one more further paths (cores). This is an alternative configuration for providing for point-to-multipoint transmission. For example, this allows a point-to-multipoint to be set up in an instance where the originating node has a shortage of available outgoing links (e.g. only one core or path is required for the initial transmission on the point-to-multipoint path until this intermediate node).

Figure 9:
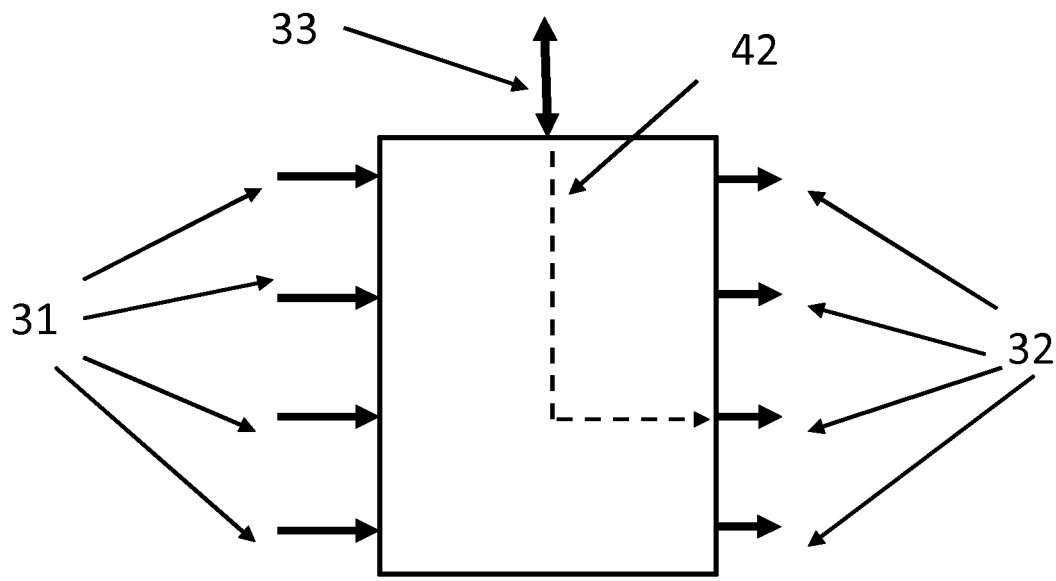
FIG. 9 is a schematic diagram of an example of the use of an electrical switching arrangement according to an embodiment.

FIG. 9 is a schematic diagram showing the handling of outgoing data streams according to an embodiment. In this example, a single data stream (42) from a server in the node is shown, which is destined for a single destination server in another node. The electrical switching arrangement configures a connection to link the server connection (33), corresponding to server connection (18), to an outgoing connection providing for transmission from an optical transmitter (32) of the optical transmitter array (24).

Figure 10:
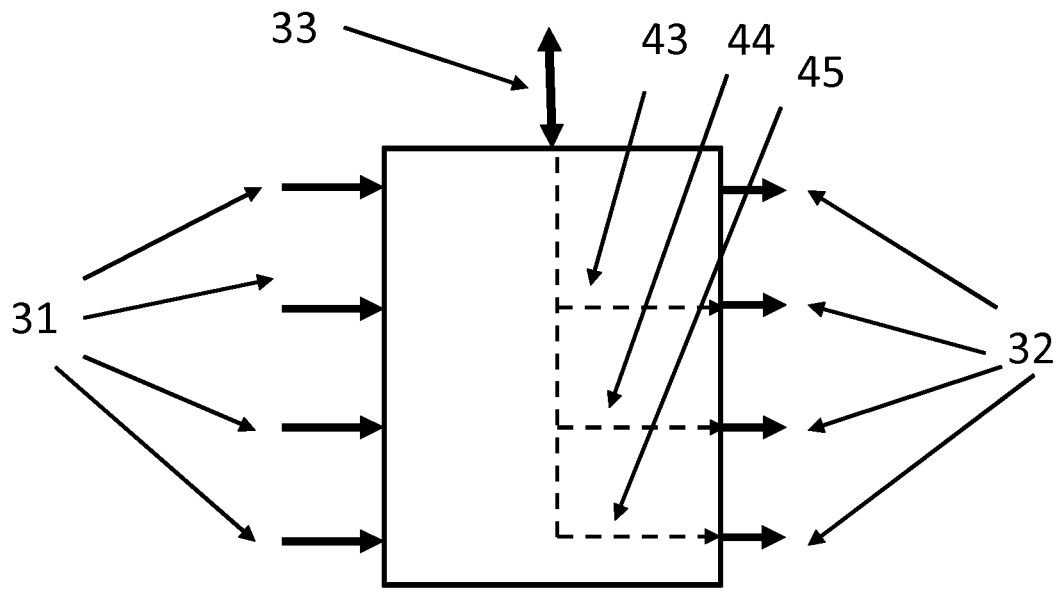
FIG. 10 is a schematic diagram of an example of the use of an electrical switching arrangement according to an embodiment.

FIG. 10 is a schematic diagram showing the handling of outgoing data streams according to a further embodiment. In the embodiment of FIG. 10, a point-to-multipoint connection for a data stream originating at the illustrated node is required. The electrical switching arrangement is configured to provide multiple connections (43, 44, 45) from the server connection (33), corresponding to server connection (18), to a plurality of outgoing connections, i.e. a plurality of transmitters (24) of the transmitter array. This enables the data stream to be transmitted to multiple nodes on different optical cores of a MCF (or paths or links). Although this configuration requires greater network capacity than the configuration of FIG. 8, it has the advantage that the data stream in a point to multipoint connection may be delivered to different nodes with a time offset between delivery at the different nodes. Hence if a destination node is already receiving another data stream, the entire point to multipoint connection does not have to be delayed.

Figure 11:
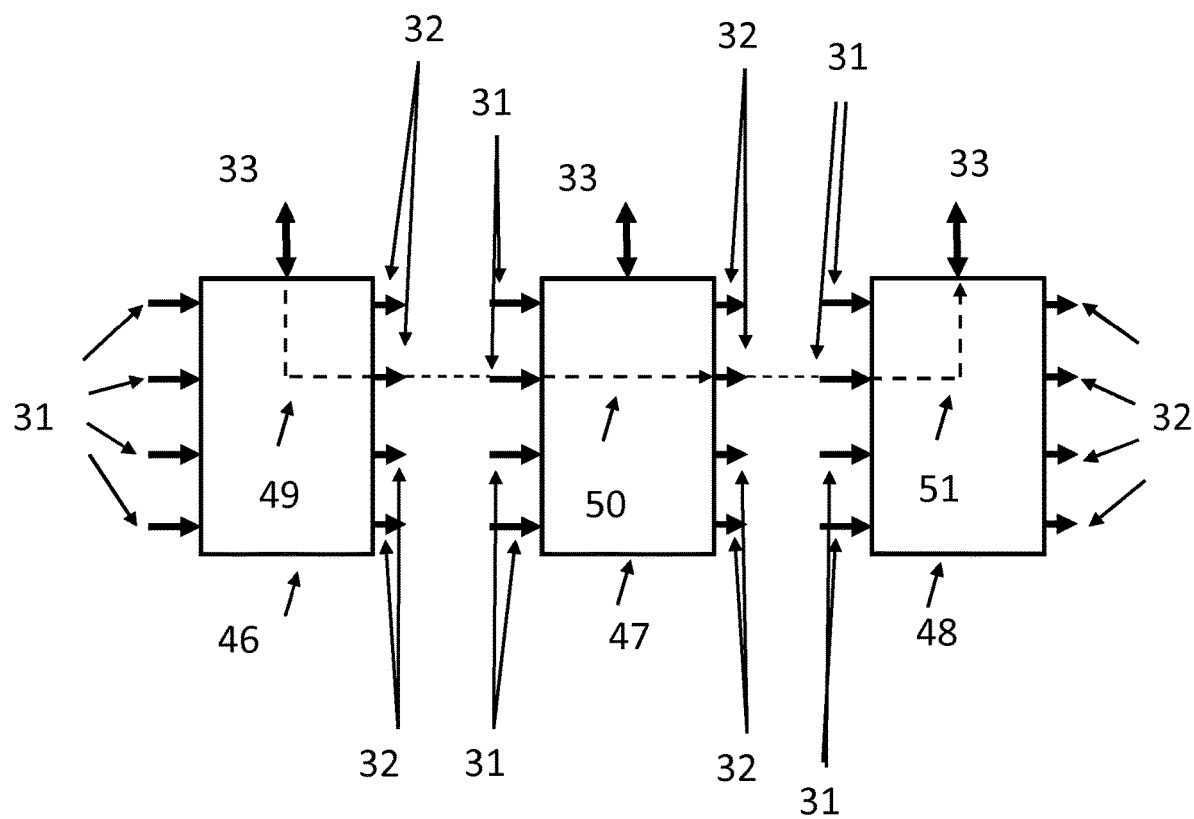
FIG. 11 is a schematic diagram of an example of the set-up of a data stream through a data center network according to an embodiment.

FIG. 11 is a schematic diagram illustrating the connection arrangements for a plurality of network nodes (46, 47, 48). At each node there are a plurality of receivers (31), a plurality of transmitters (32) and a connection to the one or more servers (33), as described in any example. In this example the data stream commences at a first node (46), bypasses the server connection of a second node (47) and is terminated at a third node (48). The switching arrangement of the first node (46) is configured to provide a connection (49) for the data stream from the server connection to a transmitter. The switching arrangement of the second node (47) is configured to provide a bypass (50) for the data stream, e.g. bypassing of the server (6). The switching arrangement of the third node (48) is configured to provide a connection (51) between a receiver and the server connection for the data stream.

Figure 12:
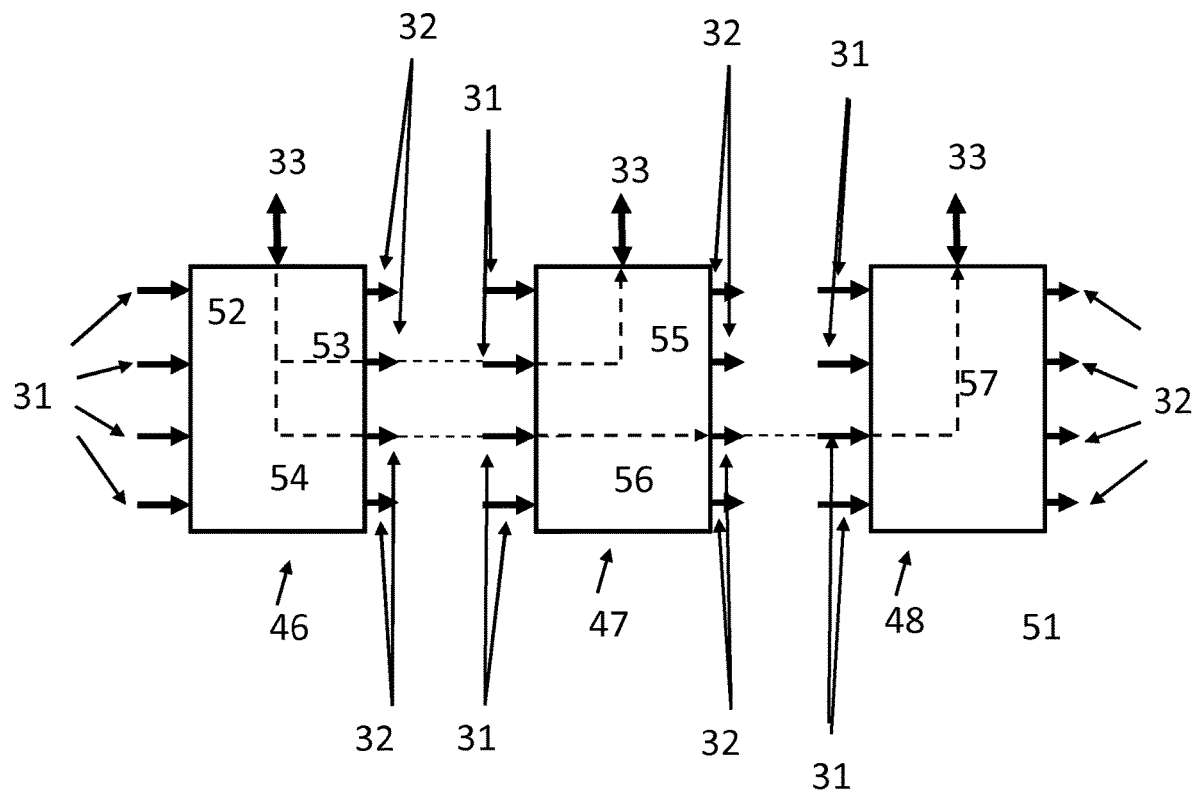
FIG. 12 is a schematic diagram of an example of the set-up of a data stream through a data center network according to an embodiment.

FIG. 12 is a schematic diagram illustrating a further example of the connection arrangements for a plurality of network nodes (46, 47, 48) according to an embodiment. As in FIG. 11, at each node there are a plurality of receivers (31), a plurality of transmitters (32) and a connection to the one or more servers (33). This example shows a point to multipoint connection from the first node (46). A data stream (52) is intended to be transmitted on the point-to-multipoint connection to two further nodes, second node (47) and third node (48). The data stream is to be transmitted on a separate path for each destination. The data stream (52) from the first node is sent to a first outgoing paths (53), which is destined for the second node (47) and a second outgoing path (54) which is destined for the third node (48). At a second node (47), the first connection is terminated and sent to the server connection (55) and the second connection bypasses the node (56). At the third node (48), the second connection is directed (57) to the server connection.

Figure 13:
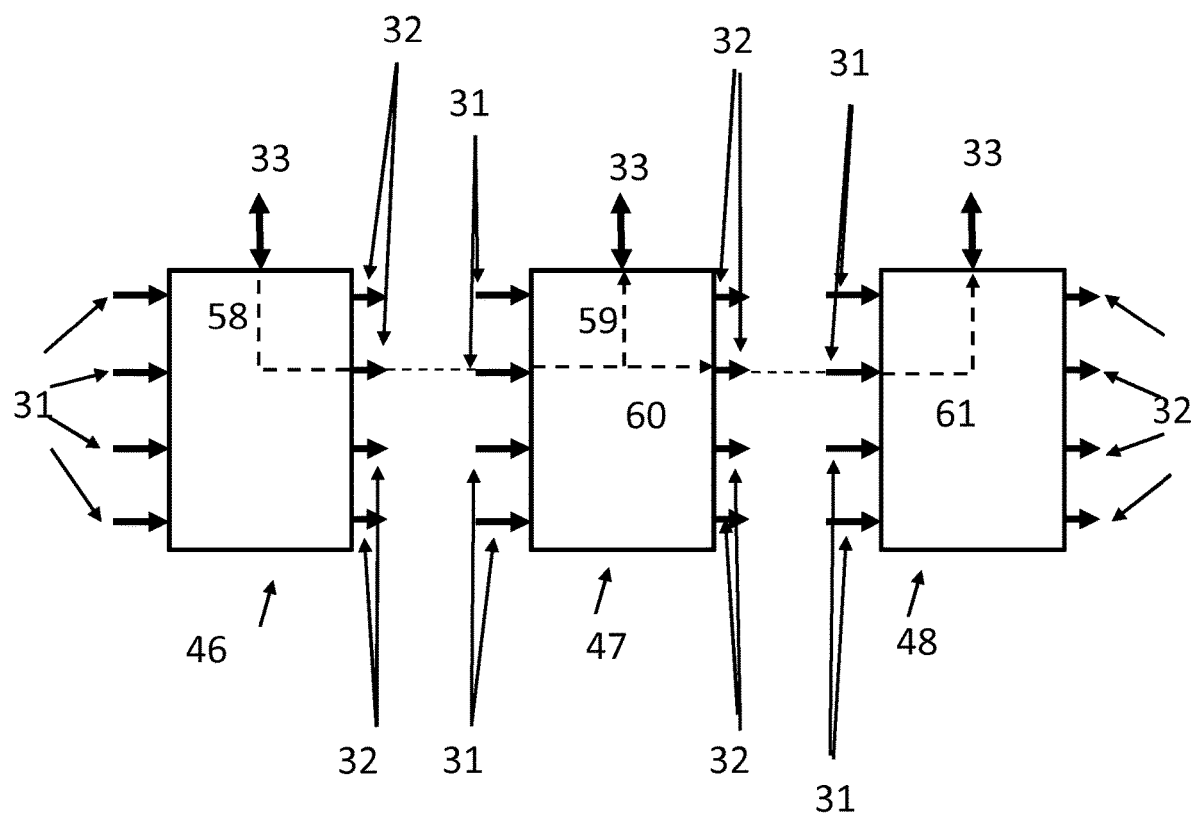
FIG. 13 is a schematic diagram of an example of the set-up of a data stream through a data center network according to an embodiment.

FIG. 13 is a schematic diagram illustrating an alternative method of implementing a point-to-multipoint connection. As in FIG. 11, at each node there are a plurality of receivers (31), a plurality of transmitters (32) and a connection to the one or more servers (33). As in the example of FIG. 12, a data stream (58) is destined to two other nodes, a second node (47) and a third node (48). However, in this example, only one path through the network is used in each connection. At the first node (46) the data stream (58) is sent only to one transmitter. At the second node, the data stream is dropped (59) to the server connection and to an outgoing transmitter (60). At the third node, the data stream is sent (61) to the server connection.

The person skilled in the art will appreciate that the methods used to establish a point-to-multipoint connection used in the examples of FIGS. 12 and 13 may be used together or separately with multiple links. An advantage of method of FIG. 12 is that the data stream may be sent to different nodes at different points in time. For example it may be necessary to send a data stream to two different nodes with a time offset between the transmissions. This may be due for example to one of the receiving servers being occupied with a previously scheduled transmission. The advantage of the scheme of FIG. 13 is that only one link from a node is occupied for a single data stream. The person skilled in the art will appreciate that the two techniques may be used separately or together in the same transmission scheduling. For example a data stream may be scheduled to be three receiving servers. One of the receiving servers may require a time offset for receiving the data stream. In this instance, the technique of FIG. 12 may be used for the server requiring the time offset and the technique of FIG. 13 used for the other two servers.

Figure 14:
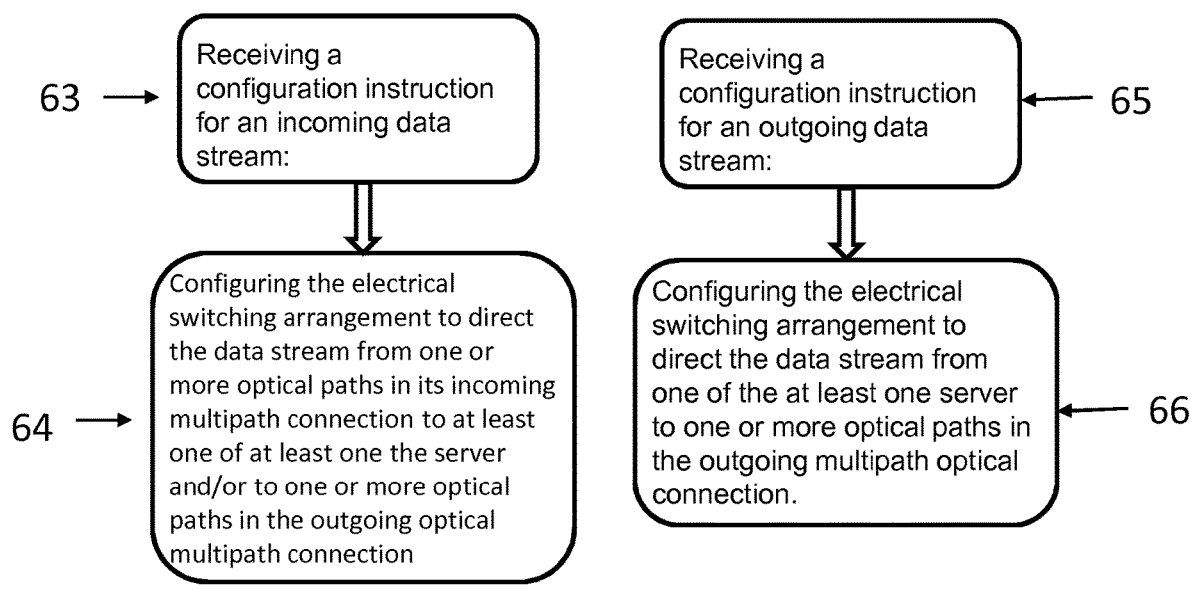
FIG. 14 is a flow chart of a method of operating a data center network node according to an embodiment.

FIG. 14 is a flow chart illustrating a method of operating a data center node according to an embodiment. At the data center node (62), receiving a configuration instruction for an incoming data stream (63), the method comprises configuring (64) the electrical switching arrangement to direct the data stream from one or more optical paths (e.g. cores of a MCF) in its incoming multi-path connection to at least one of at least one the server and/or to one or more optical paths in the outgoing optical multi-path connection. The method further comprises receiving a configuration instruction (65) for an outgoing data stream, the method comprises configuring (66) the electrical switching arrangement to direct the data stream from one of the at least one server to one or more optical paths in the outgoing multi-path optical connection.

In an embodiment, if the configuration instruction is for an for an incoming data stream associated with a point to multipoint connection the electrical switching arrangement is configured to direct the data stream from one or more optical paths in its incoming multi-path connection to at least one of at least one the server and to one or more optical paths in the outgoing optical multi-path connection.

In an embodiment, if the configuration instruction is for an outgoing data stream associated with a point to multipoint connection, the electrical switching arrangement is configured to direct the data stream from one of the at least one server to a plurality of optical paths in the outgoing multi-path optical connection.

Figure 15:
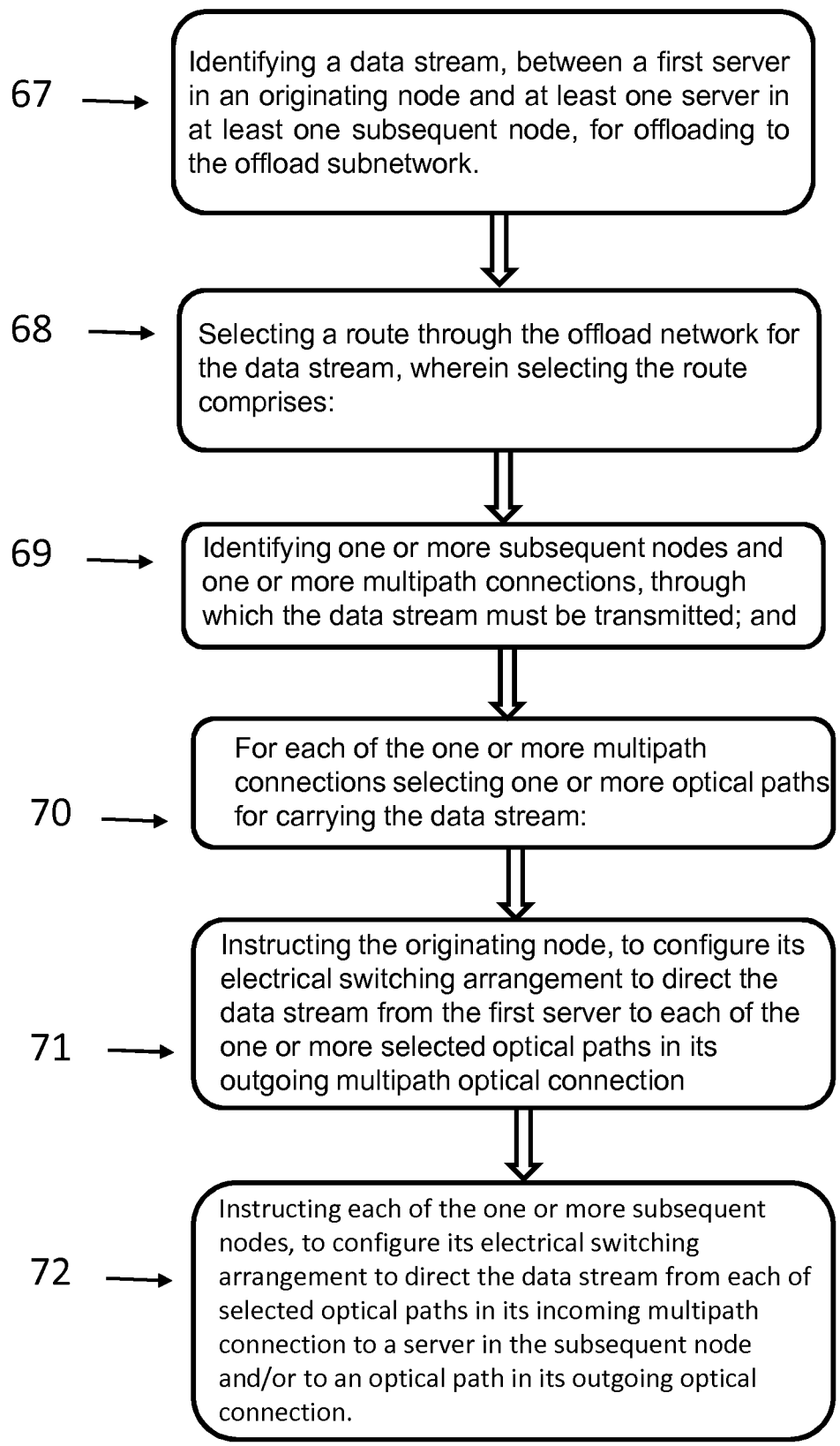
FIG. 15 is a flow chart of a method of operating a data center network according to an embodiment.

FIG. 15 is a flow chart of a method of operating a data center network according to an embodiment. For example, the method may be implemented by the orchestrator or other management or control entity. The method starts by identifying (67) a data stream, between a first server in an originating node and at least one server in at least one subsequent node, for offloading to the offload subnetwork. A route is selected (68) through the offload network for the data stream. The selection of the route comprises identifying (69) one or more subsequent nodes and/or one or more multi-path connections, through which the data stream must be transmitted. For each of the one or more multi-path connections (70) one or more optical paths are selected for carrying the data stream the originating node is instructed (71) to configure its electrical switching arrangement to direct the data stream from the first server to each of the one or more selected optical paths in its outgoing multi-path optical connection. Each of the one or more subsequent nodes is instructed (72) to configure its electrical switching arrangement to direct the data stream from each of selected optical paths in its incoming multi-path connection to a server in the subsequent node and/or to an optical path in its outgoing optical connection.

In an embodiment, a data stream may be sent to a first server in a first node and, with a time offset to a second node in a second node. The method requires all of the steps of the embodiment of FIG. 15.

Figure 16:
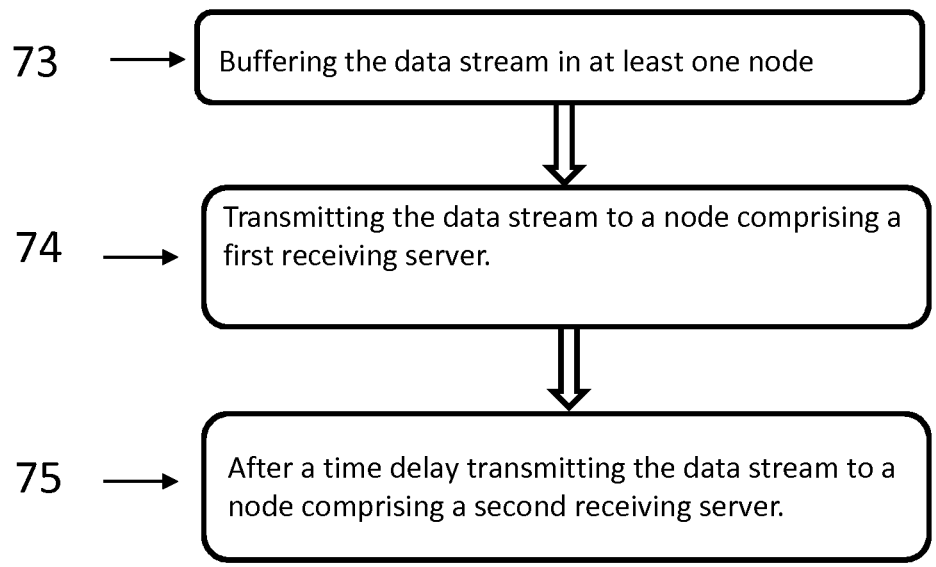
FIG. 16 is a flow chart of a method of operating a data center network according to an embodiment.

FIG. 16 is a flow chart illustrating the further steps required for this embodiment. The data stream is buffered (73) in at least one node. In an embodiment, this is the originating node, but the person skilled in the art will appreciate that the buffering may take place at any intermediate node. The invention is not limited to any location of the buffering. The data stream is then transmitted (74) to the node comprising the first receiving server. After a time delay the data stream is transmitted (75) to the node comprising the second receiving server. In some examples, the buffering provides for a time delay to avoid conflict with another transmission or processing function.

In order to configure the offload subnetwork, there is a requirement to identify which flows are to be offloaded onto the optical offload subnetwork. The quantitative definition of an elephant flow can be determined by network operators according to criteria. High bandwidth flows or "elephant flows" are those that send more than a given threshold of the link capacity, during a given measurement interval. A flow is a set of packets that match the same properties, such as source/destination TCP ports. For the purpose of this disclosure, an elephant flow or high bandwidth flow is any flow which is identified as requiring more than a given threshold of network capacity.

In an embodiment, high bandwidth flows which may be offloaded onto the offload subnetwork are identified by using a threshold related to network capacity. Typically this threshold relates to available bandwidth. Flows which have a bandwidth requirement above the threshold are designated as high bandwidth flows and the capacity demands associated with them are referred to as high bandwidth flow demands. The threshold may be set by the operator or set in a default. The person skilled in the art will appreciate that there are different options for the level of the threshold, the means of setting the threshold and network parameter to which the threshold relates. The invention is not limited to any one level of threshold, means of setting the threshold or network parameter to which it relates.

Once high bandwidth flow demands have been identified, a schedule of logical links between the nodes of the network is constructed so as to enable the high bandwidth flows to be transmitted on the offload network. In an embodiment the schedule of logical links comprises a list of pairs of nodes, the originating node and the terminating node, to be linked, the order in which they are to be linked and the duration of the logical links. In a further embodiment, the schedule comprises a list of pairs of nodes or an originating node and a plurality of terminating nodes, in the case of point-to-multipoint connections. In each case, intermediate nodes and/or optical connection to be used between the originating and terminating nodes must be identified.

In an embodiment, this schedule is based on an indication of the amount of data estimated for each flow and the nodes between which the flow is required to be transmitted. The time required for the flow may not be known a priori as this depends on the bit rate of the connection. In some cases, the traffic demand can have additional constraints, such as maximum latency, time limit for transmission etc. In an embodiment, this schedule is constructed based on the bandwidth requirements of each of the high bandwidth flow demands. In an embodiment, the delay sensitivity of the flows is considered when scheduling the order and duration of the logical links. In an embodiment, the delay variation sensitivity of the flows is considered when scheduling the order and duration of the logical links. The person skilled in the art will appreciate that there are many different ways in which an appropriate schedule can be implemented and the invention is not limited to any one scheduling method.

The presence of an optical offload may not guarantee that all high bandwidth flows are enabled to use the offload. However, the conventional subnetwork is available and the inability to offload does not mean that data is lost. The option of using the conventional subnetwork means that, in an embodiment, this can be incorporated into the offload scheduling.

Figure 17:
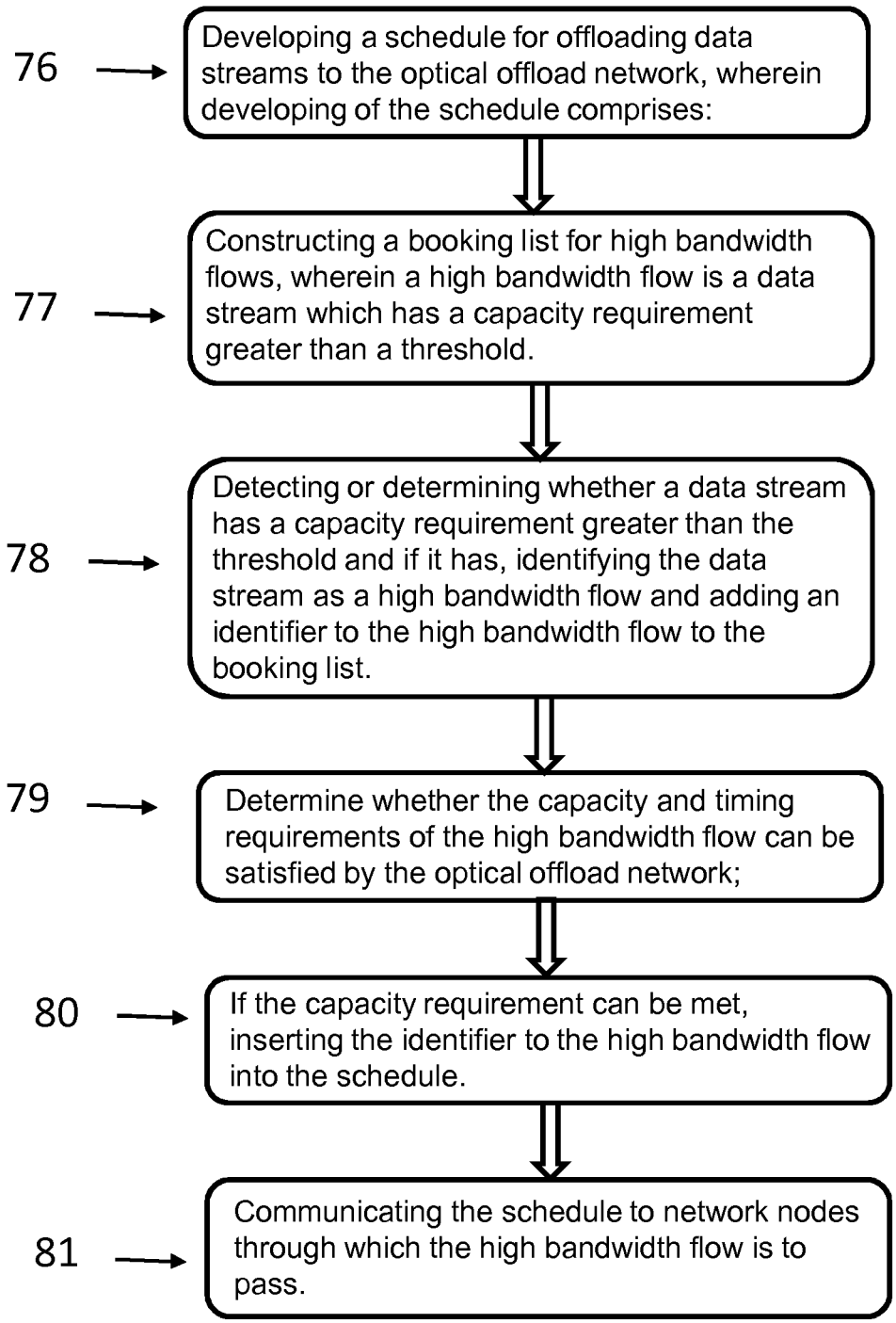
FIG. 17 is a flow chart of a method of developing a schedule for optical offload in a data center network according to an embodiment.

FIG. 17 is a flowchart illustrating a method of developing a schedule (76) for offloading data streams to the optical offload network. The method may be implemented in the orchestrator or other management or control entity. The development of the schedule comprises constructing (77) a booking list for high bandwidth flows, wherein a high bandwidth flow is a data stream which has a capacity requirement greater than a threshold. The next step is to detect or determine (78) whether a data stream has a capacity requirement greater than the threshold and if it has, identifying the data stream as a high bandwidth flow and adding an identifier to the high bandwidth flow to the booking list. It is next determined (79) whether the capacity and timing requirements of the high bandwidth flow can be satisfied by the optical offload network. If the capacity requirement can be met (80), inserting the identifier to the high bandwidth flow into the schedule. The schedule is then communicated (81) to network nodes through which the high bandwidth flow is to pass.

Figure 18:
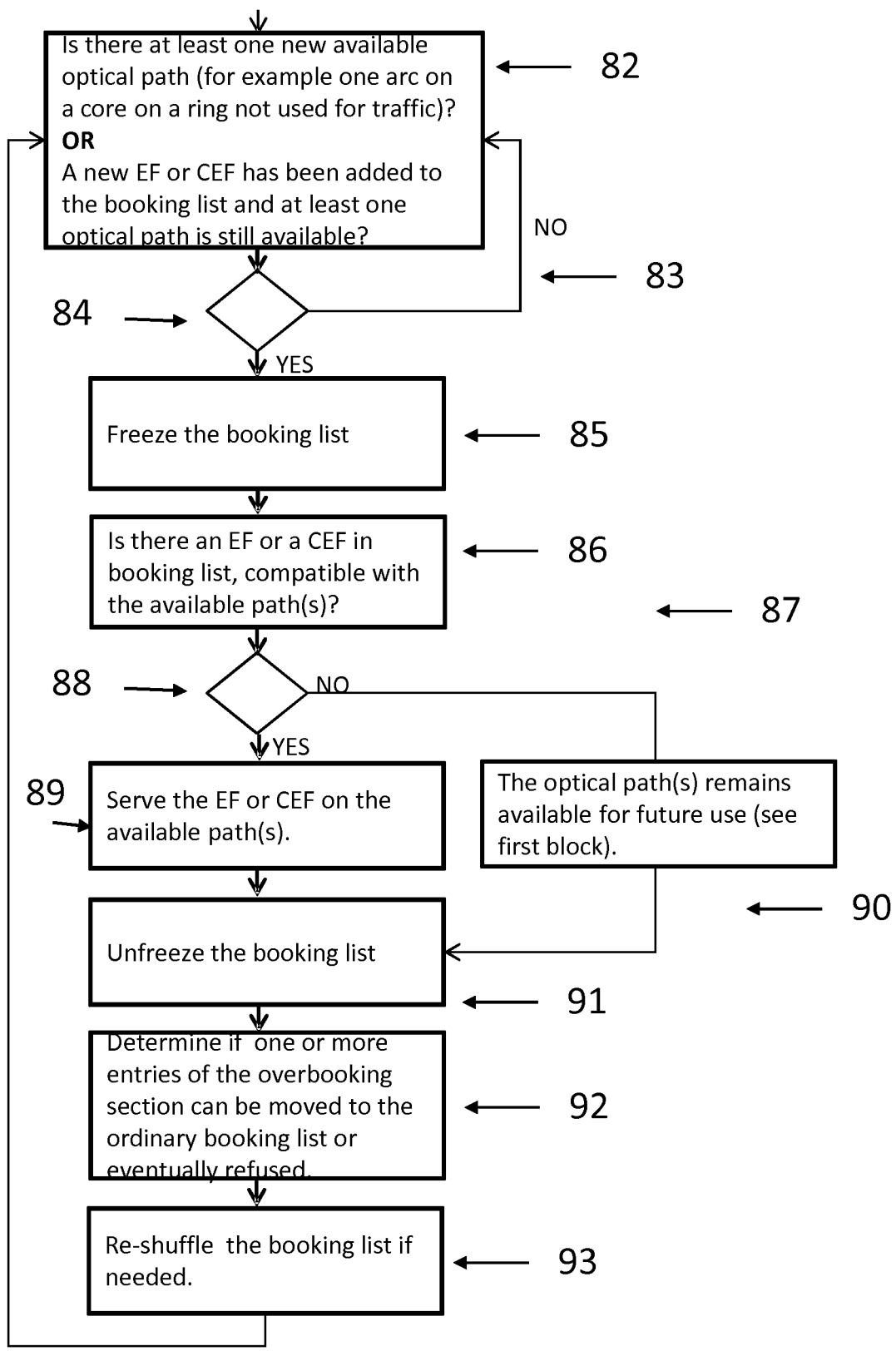
FIG. 18 is a flow chart of a method of updating a schedule for optical offload in a data center network according to an embodiment.

FIG. 18 is a flow chart of managing a booking list according to an embodiment. The method may be implemented in the orchestrator or other management or control entity. A determination (82) is made as to whether there is at least one new available optical path (for example one arc on a core on a ring not used for traffic) or whether a new high elephant flow, EF, or collection of elephant flows, CEF, has been added to the booking list and that at least one optical path is still available. If this condition is not met (83), the method continues to make the determination. If the condition is met (84), the booking list is frozen (85). A determination is then made as to whether there is an EF or a CEF in the booking list which is compatible with the available paths (86). If no (87), the paths remain free for use and the booking list is unfrozen (90). If yes (88), then the EF or CEF is served on the available path or paths (89) and the booking list is unfrozen (91). It is then determined (92) whether one or more entries of the overbooking section can be moved to the ordinary booking list or eventually refused. The booking list is then reshuffled if necessary (93).

Figure 19:
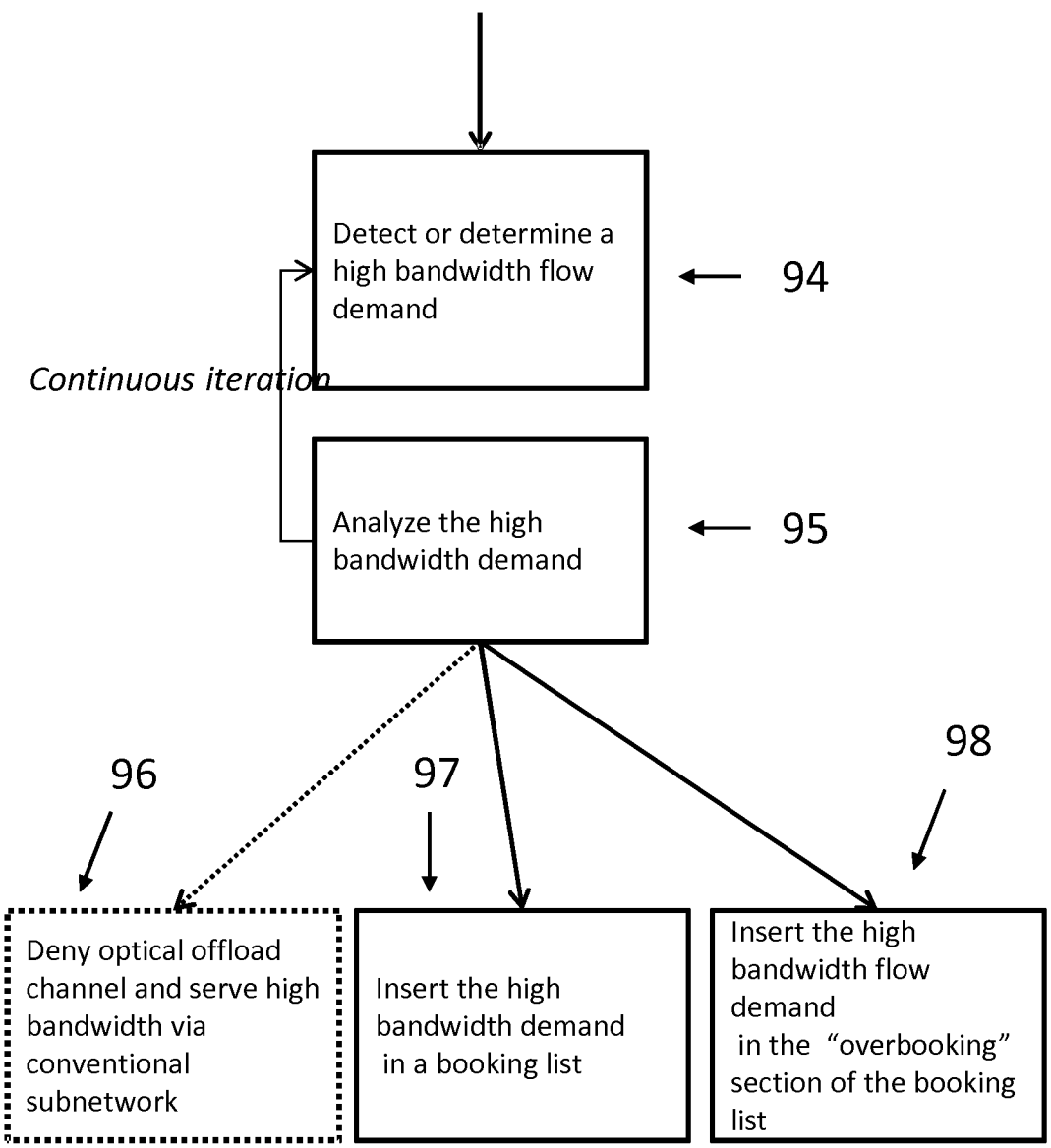
FIG. 19 is a flow chart of a method of serving high bandwidth flows in a data center network according to an embodiment.

FIG. 19 is a flow chart showing the steps of such a scheduling method according to an embodiment. A high bandwidth flow demand is detected or determined (94). The high bandwidth flow is then analyzed (95). This analysis can comprise determining total data flow requirements, latency, time limits etc. Once this analysis has taken place, in an embodiment, the orchestrator has three options. These options are to refuse the use of the offload subnetwork (96), to insert the high bandwidth flow demand into a booking list (97) for construction of the schedule of logical links and to accept the high bandwidth flow demand into an "overbooking" section of the booking list (98). The person skilled in the art will appreciate that all combinations of these options may be used and the invention is not limited to any one combination of options.

In an embodiment when an optical transmitter or receiver is not involved in the transmission of a data stream, the transmitter or receiver is maintained in an idle mode in order to save energy. Transitions between the normal operating mode and the idle mode (and vice versa) waste time and hence network capacity, especially in case of high bit rates transmission. As a consequence, number of transitions should be minimized. In an embodiment, the booking list for the offload subnetwork is organized so as to minimize such transitions.

There are also different techniques which may be used to detect or determine high bandwidth flows. In an embodiment, servers are polled to determine their data requirements. In an embodiment, high bandwidth flows may be detected at the cross point switches. In an embodiment, planned data flows, such as backup or virtual machine migration may be used. In an embodiment, combinations of these techniques may be used. The person skilled in the art will appreciate that there are many options for determining or detecting high bandwidth flows and the invention is not limited to any one method.

In an embodiment, the data center network comprises an orchestrator which detects high bandwidth or elephant flows and schedules their transmission on the optical offload network. In an embodiment, the nodes are configured to receive instructions from the orchestrator. In alternative embodiments, a more distributed system of control is provided.

Figure 20:
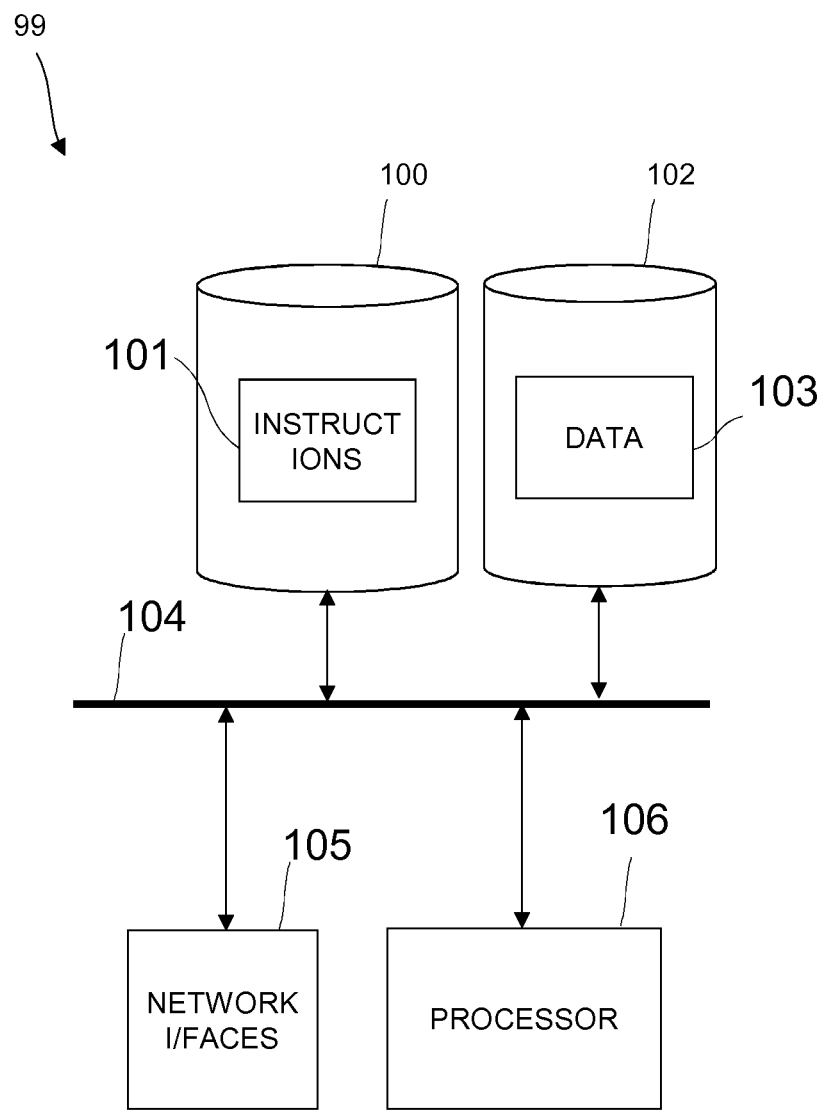
FIG. 20 is schematic diagram of the units of an orchestrator according to an embodiment.

FIG. 20 is a schematic diagram illustrating the components of an orchestrator (99) according to an embodiment. There is provided a memory (100) for storing instructions (101), a memory (102) for storing data (103), a processor (106) for implementing the instructions, a plurality of network interfaces (105) for receiving data and a bus (104) for connecting the components of the orchestrator.

The processor, which may alternatively be termed a processing circuitry, may comprise one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. For example, the processing circuitry may be programmable hardware capable of executing machine instructions stored as a machine-readable computer program in the memory, which may alternatively be termed a memory circuitry. The memory circuitry of the various embodiments may comprise any non-transitory machine-readable media known in the art or that may be developed, including but not limited to magnetic media (e.g., floppy disc, hard disc drive, etc.), optical media (e.g., CD-ROM, DVD-ROM, etc.), solid state media (e.g., SRAM, DRAM, DDRAM, ROM, PROM, EPROM, Flash memory, solid state disc, etc.), or the like.

The orchestrator may comprise a computer program, comprising instructions which, when executed on the at least one processor, causes the at least one processor to carry out a method according to any example. In some examples, a computer program product comprises a computer program according to any example.

In some examples, the network node comprises a processor, memory and optionally further elements described in FIG. 20. The processor may be configured to receive control instructions, e.g. from the orchestrator, and provide one or more output to configure the electrical switching arrangement according to any example. This local control of the electrical switching arrangement, e.g. by a controller of the electrical switching arrangement, may be considered as a part of the electrical switching arrangement, and is not shown separately.

In an embodiment, the orchestrator is configured to set a threshold for identifying a data stream as a high bandwidth flow if the data stream has a capacity requirement higher than the threshold during a measurement period, detect or determine high bandwidth flow demands by comparing capacity requirements of data stream with the threshold and construct a schedule for transmission of high bandwidth flows between network nodes in the optical offload subnetwork. In an embodiment the orchestrator is further configured to identify two or more nodes through which a high bandwidth flow is to pass and provide instructions to provide each of the two or more nodes with one or more of:

(1) a configuration instruction for an outgoing data stream which instructs the node to configure the electrical switching arrangement to direct the data stream from one of the at least one server to one or more optical paths in the outgoing multi-path optical connection; and (2) a configuration instruction for an incoming data stream which instructs the node to configure the electrical switching arrangement to direct the data stream from one or more optical paths in its incoming multi-path connection to at least one of at least one the server and/or to one or more optical paths in the outgoing optical multipath connection.

Figure 21:
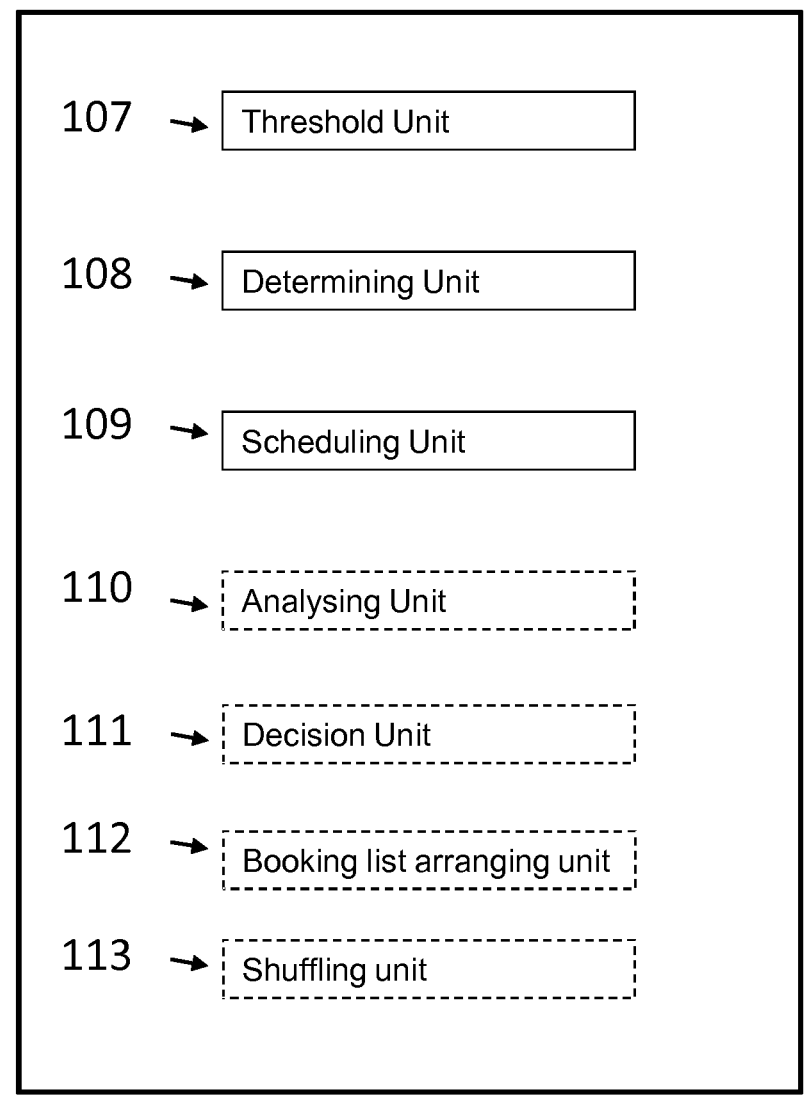
FIG. 21 is a schematic diagram of the logical functions of an orchestrator according to an embodiment.

FIG. 21 is a schematic diagram of units for use in an orchestrator (99) according to an embodiment. The orchestrator comprises a threshold unit (107) for setting a threshold for identifying a flow demand as a high bandwidth flow if the flow demand has a capacity requirement higher than the threshold during a measurement period. The orchestrator comprises a determining unit (108) for detecting or determining high bandwidth flow demands by comparing capacity requirements of flow demands with the threshold. The orchestrator comprises a scheduling unit (109) for constructing a schedule of logical links for transmission of high bandwidth flows between network nodes in the offload subnetwork. In an embodiment the orchestrator further comprises an analyzing unit (110) for analyzing each high bandwidth flow demand. The orchestrator comprises a decision unit (111) for, on the basis of the analyzing, performing one of three operations: denying optical offload, inserting the high bandwidth flow demand into a booking list and inserting the high bandwidth flow demand into an overbooking list. In another embodiment, the orchestrator further comprises a booking list arranging unit (112) for moving a second high bandwidth flow demand in the booking list into a first position. The orchestrator comprises a re-scrambling unit (113) for determining if the list may be re-scrambled and determining if one or more entries in the overbooking list may be moved to the booking list or refused.

Figure 22:
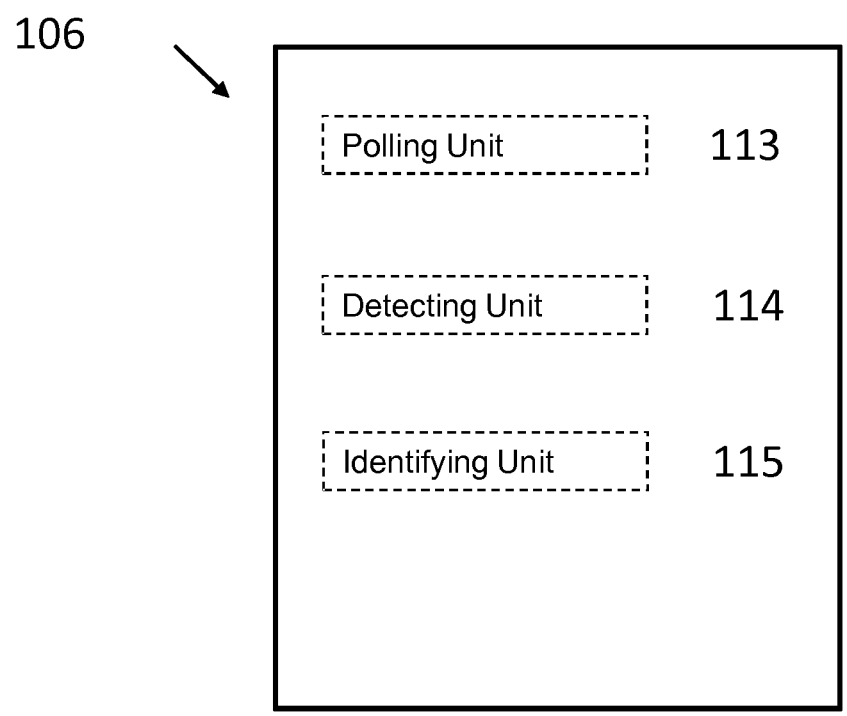
FIG. 22 is schematic diagram of the logical units of a determining unit within an orchestrator according to an embodiment.

FIG. 22 is a schematic diagram of the units for use in a determining unit for an orchestrator according to an embodiment. In an embodiment, the determining unit comprises a polling unit (113) for periodically polling of network nodes. In another embodiment, the determining unit comprises a detecting unit (114) for detecting high bandwidth flow demands at a cross-point switch. In yet another embodiment the determining unit comprises an identifying unit (115) for identifying high bandwidth flow demands from planned data transfers. The person skilled in the art will appreciate that any combination of the polling unit, the detecting unit and the identifying unit may be used. The invention is not limited to any one unit or combination of units.

In addition to the above described embodiments, the invention may be implemented in the following embodiments. For example, there is provided an orchestrator for controlling optical offloads in a data center network according to an embodiment. The orchestrator comprises the following functional items: a threshold unit for setting a threshold for identifying a data stream as a high bandwidth flow if the data stream has a capacity requirement higher than the threshold during a measurement period; a determining unit for detecting or determining high bandwidth flow demands by comparing capacity requirements of data stream with the threshold; and a scheduling unit for constructing a schedule for transmission of high bandwidth flows between network nodes in the optical offload subnetwork.

In some examples, the orchestrator optionally further comprises an analyzing unit for analyzing each high bandwidth flow demand; and a decision unit for, on the basis of the analyzing, performing one of three operations: denying optical offload, inserting the high bandwidth flow demand into a booking list and inserting the high bandwidth flow demand into an overbooking list.

In some examples, the orchestrator optionally further comprises: a booking list arranging unit for moving a second high bandwidth flow demand in the booking list into a first position; and a shuffling unit for determining if the list may be shuffled and determining if one or more entries in the overbooking list may be moved to the booking list or refused.

In some examples, the orchestrator optionally further comprises a polling unit for periodically polling of network nodes. In some examples, the determining unit comprises a detecting unit for detecting high bandwidth flow demands at a cross-point switch. In some examples, the determining unit comprises an identifying unit for identifying high bandwidth flow demands from planned data transfers.

In some aspects, the disclosure provides an orchestrator configured to control an electrical switching arrangement for an optical offload network of a data center node, the orchestrator comprising processing circuitry, configured by executable instructions in a memory to implement the method of any example.

In some aspects, the disclosure provides network node, or an optical unit, configured to control an electrical switching arrangement for an optical offload network of a data center node, the orchestrator comprising processing circuitry, configured by executable instructions in a memory to implement the method of any example.

Alternatively to use of multicore optical fibers, a further embodiment uses a single core optical fiber in conjunction with wavelength division multiplexing. At each node, in an embodiment, each transmitter transmits with a different wavelength. The transmitter array is provided with a wavelength division multiplexer to couple the transmitter wavelengths into the fiber. A wavelength division de-multiplexer is provided couple the incoming wavelengths to the receivers in the receiver array. In another embodiment, tunable lasers are used to provide different wavelengths. In a further embodiment, multiple optical fibers are used to provide multiple paths between nodes. Each of these options provides the required multi-path connections which link the nodes. Each multi-path connection comprises a plurality of optical links. In for example the multicore option, the multipath connection is the multicore fiber and each core in the fiber provides a link. In the multiple wavelength option, the fiber is the multi-path connection and each of the wavelengths provides a link.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A data center network node comprising:
a connection for connecting at least one server to a first subnetwork, the first subnetwork comprising at least one of a switch or a router; and an electrical switching arrangement;
at least one server connection for connecting the electrical switching arrangement to a server;
an optical receiver array for connecting the electrical switching arrangement to an optical offload subnetwork;
an optical transmitter array for connecting the electrical switching arrangement to an optical offload subnetwork; and
wherein the electrical switching arrangement is configured to direct an incoming data stream from a receiver in the receiver array to at least one of the at least one server connection or at least one transmitter in the transmitter array, and to direct an outgoing data stream from one of the at least one server connection to at least one transmitter in the transmitter array,
wherein the electrical switching arrangement is configured to (a) receive a data stream for a point to multipoint connection at one of a plurality of receivers, (b) direct the data stream from the receiver to one of the at least one server connection and (c) direct the data stream to one or more of a plurality of transmitters; and
wherein the electrical switching arrangement is configured to enable an incoming data stream to bypass the at least server connection; and
wherein the electrical switching arrangement is further configured to:
receive a first copy of a data stream for a point to multipoint connection at a first receiver; receive a second copy of the data stream for the point to multipoint connection at a second receiver; direct the data stream from the first receiver to one of the at least one server; and direct the data stream from the second receiver to at least one transmitter.

2. A data center network node according to claim 1, wherein the optical receiver array is configured such that each of the receivers is connectable to an optical path within a multi-path optical connection and the optical transmitter array is configured such that each of the at least one transmitter is connectable to an optical path within a multi-path optical connection.

3. A data center network node according claim 1, wherein the optical receiver array comprises a connector for connecting the receiver to a multicore optical fiber and the optical transmitter array comprises a coupler for coupling the at least one transmitter to a multicore, optical fiber.

4. A data center network node according claim 1, wherein the electrical switching arrangement is configurable to direct a data stream from one of the at least one server connection to the plurality of transmitters.

5. A data center network node according to claim 4, further configured to:
buffer the data stream;
transmit the data stream to a first of the plurality of transmitters; and
transmit the data stream to a second of the plurality of transmitters after a time delay.

6. A data center network node according to claim 1, further configured to enable one or more transmitters and receivers, when not involved in a data stream transmission, to be put into an idle mode.

7. A data center network comprising a first subnetwork, an optical offload subnetwork and a plurality of network nodes, wherein:
the first subnetwork comprises at least one of a switch or a router;
each network node comprises a connection for connecting the at least one server to the first subnetwork, an electrical switching arrangement, at least one server connection for connecting the electrical switching arrangement to a server, an optical receiver array for connecting the electrical switching arrangement to an optical offload subnetwork, an optical transmitter array for connecting the electrical switching arrangement to an optical offload subnetwork, wherein the electrical switching arrangement is configured to direct an incoming data stream from a receiver in the receiver array to at least one of the at least one server connection or at least one transmitter in the transmitter array and to direct an outgoing data stream from one of the at least one server connection to at least one transmitter in the transmitter array;
the optical offload subnetwork comprises a plurality of optical multi-path connections, each optical multi-path connection comprising a plurality of optical paths, the optical offload subnetwork being configured such that each node is connected to at least one other node by an optical multi-path connection; and
wherein the data center network further comprising an orchestrator for scheduling transmission on the optical offload subnetwork, the orchestrator comprising a processor, a memory and a network interface card, the orchestrator being configured to:
set a threshold for identifying a data stream as a high bandwidth flow if the data stream has a capacity requirement higher than the threshold during a measurement period;
detecting or determining high bandwidth flow demands by comparing capacity requirements of data stream with the threshold;
construct a schedule for transmission of high bandwidth flows between network nodes in the optical offload subnetwork; and
identify two or more nodes through which a high bandwidth flow is to pass and provide instructions to provide each of the two or more nodes with one or more of:
a configuration instruction for an outgoing data stream which instructs the node to configure the electrical switching arrangement to direct the data stream from one of the at least one server to one or more optical paths in an outgoing multi-path optical connection; and
a configuration instruction for an incoming data stream which instructs the node to configure the electrical switching arrangement to direct the data stream from one or more optical paths in an incoming multi-path connection to at least one of at least one the server and/or to one or more optical paths in the outgoing optical multipath connection.

8. A data center network according to claim 7, wherein at least one optical multi-path connection comprises a multicore optical fiber and each optical path comprises a core within the multicore fiber.

9. A data center network according to claim 7, wherein the electrical switching arrangement of at least one node is configurable to direct an outgoing data stream from one of the at least one server to a plurality of transmitters in the transmitter array, such as to enable a point to multipoint connection far the data stream by copying the data stream to a plurality of transmitters at the at least one node.

10. A data center network according to claim 7, wherein the electrical switching arrangement of at least one node is configurable to direct incoming an data stream from a receiver in the receiver array to one of the at least one server and to at least one transmitter in the transmitter array, such as to enable a point to multipoint connection for the data stream by copying the data stream to the at least one server and to at least one server in at least one other node.

11. A method of operating a data center network node, the node comprising a connection for connecting at least one server to a first subnetwork, an electrical switching arrangement, at least one server connection for connecting the electrical switching arrangement to a server, an optical receiver array for connecting the electrical switching arrangement to an optical offload subnetwork, an optical transmitter array for connecting the electrical switching arrangement to an optical offload subnetwork, wherein the electrical switching arrangement is configured to direct an incoming data stream from a receiver in the receiver array to at least one of the at least one server connection or at least one transmitter in the transmitter array and to direct an outgoing data stream from one of the at least one server connection to at least one transmitter in the transmitter array, the method comprising:
- on receipt of a configuration instruction for an outgoing data stream: configuring the electrical switching arrangement to direct the data stream from one of the at least one server to one or more optical paths in an outgoing multi-path optical connection;
- on receipt of a configuration instruction for an incoming data stream: configuring the electrical switching arrangement to direct the data stream from one or more optical paths in an incoming multi-path connection to at least one of at least one the server and/or to one or more optical paths in the outgoing multi-path optical connection;
- on receipt of a configuration instruction for an outgoing data stream associated with a point to multipoint connection:
- configuring the electrical switching arrangement to direct the data stream from one of the at least one server to a plurality of optical paths in the outgoing multi-path optical connection; and
- on receipt of a configuration instruction for an incoming data stream associated with a point to multipoint connection:
- configuring the electrical switching arrangement to direct the data stream from one or more optical paths in the incoming multi-path connection to at least one of at least one the server and to one or more optical paths in the outgoing multi-path optical connection,
- wherein configuring the electrical switching arrangement enables the incoming data stream to bypass the server connection; and
- wherein the electrical switching arrangement is further configured to:
- receive a first copy of a data stream for a point to multipoint connection at a first receiver; receive a second copy of the data stream for the point to multipoint connection at a second receiver; direct the data stream from the first receiver to one of the at least one server; and direct the data stream from the second receiver to at least one transmitter.

12. A method according to claim 11, the method further comprising:
- implementing a first transmission of the data stream on a first optical path; and
- implementing a second transmission of the data stream on a second optical path with a time offset between the first transmission and the second transmission.

13. A method according to claim 11, further comprising putting into idle mode at least one receiver or transmitter which is not involved in the transmission of a data stream.

14. A non-transitory computer-readable storage medium comprising, having stored thereupon, a computer program, comprising instructions which, when executed on at least one processor, cause the at least one processor to carry out a method according to claim 11.

15. A computer program product comprising a non-transitory computer readable storage medium storing a computer program as claimed in claim 14.

16. A method of operating a data center network, the network comprising a plurality of nodes linked by: a first subnetwork comprising at least one of a switch or a router, and an optical offload subnetwork comprising a plurality of multi-path optical connections, wherein each node comprises a connection for connecting at least one server to the first subnetwork, an electrical switching arrangement at least one server connection for connecting the electrical switching arrangement to a server, an optical receiver array for connecting the electrical switching arrangement to an optical offload subnetwork, an optical transmitter array for connecting the electrical switching arrangement to an optical offload subnetwork, wherein the electrical switching arrangement is configured to direct an incoming data stream from a receiver in the receiver array to at least one of the at least one server connection or at least one transmitter in the transmitter array, and to direct an outgoing data stream from one of the at least one server connection to at least one transmitter in the transmitter array, the method comprising:
- identifying a data stream, between a first server in an originating node and at least one server in at least one subsequent node, for offloading to the optical offload subnetwork;
- selecting a route through the optical offload subnetwork for the data stream, wherein selecting the route comprises:
- identifying one or more subsequent nodes and/or one or more multi-path connections, through which the data stream must be transmitted; and
- for each of the one or more multi-path connections selecting one or more optical paths for carrying the data stream;
- instructing the originating node, to configure the electrical switching arrangement to direct the data stream from the first server to each of the one or more selected optical paths in an outgoing multi-path optical connection; and
- instructing each of the one or more subsequent nodes, to configure the electrical switching arrangement to direct the data stream from each of selected optical paths in an incoming multi-path optical connection to a server in the subsequent node and/or to an optical path in the outgoing multi-path optical connection,
wherein a plurality of data streams are to be transmitted, the method further comprising:
developing a schedule for offloading data streams to the optical offload network, wherein developing of the schedule comprises;
constructing a booking list for high bandwidth flows, wherein a high bandwidth flow is a data stream which has a capacity requirement greater than a threshold;
detecting or determining whether a data stream has a capacity requirement greater than the threshold and if it has, identifying the data stream as a high bandwidth flow and adding an identifier to the high bandwidth flow to the booking list;
determine whether the capacity and timing requirements of the high bandwidth flow can be satisfied by the optical offload network;
if the capacity requirement can be met, inserting the identifier to the high bandwidth flow into the schedule;
communicating the schedule to network nodes through which the high bandwidth flow is to pass.

17. A method according to claim 16, wherein the data stream is to be transmitted to a plurality of receiving servers, the method further comprising:
buffering the data stream in at least one node;
transmitting the data stream to a node comprising a first receiving server; and
after a time delay transmitting the data stream to a node comprising a second receiving server.

18. A method according to claim 16, the method further comprising establishing a point to multipoint connection by instructing the originating node, to configure the electrical switching arrangement to direct the data stream from the first server to a plurality of selected optical paths in the outgoing multi-path optical connection.

19. A method according to claim 16, the method further comprising establishing a point to multipoint connection by instructing the originating node to configure the electrical switching arrangement to direct the data stream from the first server to a selected optical path in the outgoing multi-path optical connection and instructing at least one subsequent node to configure the electrical switching arrangement to direct the data stream from an optical paths in the incoming multi-path optical connection to both a to a server in the subsequent node and to an optical path in the outgoing multi-path optical connection.

* * * * *